United States Patent [19]

Ozkahyaoglu et al.

[11] Patent Number: 5,089,144
[45] Date of Patent: Feb. 18, 1992

[54] FILTER CONDITION INDICATOR HAVING MOVEABLE SENSOR AND AGGREGATE FLOW COUNTER

[75] Inventors: Aysegul Ozkahyaoglu; Marty M. Zoerner, both of Reed City, Mich.

[73] Assignee: Nartron Corporation, Reed City, Mich.

[21] Appl. No.: 447,794

[22] Filed: Dec. 8, 1989

[51] Int. Cl.$^5$ ............................................. B01D 35/143
[52] U.S. Cl. .................... 210/767; 73/861.52; 210/87; 210/192; 210/806; 340/606; 340/825.65
[58] Field of Search .................. 210/85, 87, 88, 89, 210/192, 739, 748, 744, 259, 767, 94, 806; 55/270, 274; 340/607, 611, 609, 606, 825.65; 73/861.63, 861.52

[56] References Cited

U.S. PATENT DOCUMENTS

| | | | |
|---|---|---|---|
| 329,064 | 10/1885 | Moore | 210/85 |
| 3,540,030 | 11/1970 | Hartz | 340/825.65 |
| 3,585,596 | 6/1971 | Rosenblatt | 340/825.65 |
| 4,272,368 | 6/1981 | Foord et al. | 210/90 |
| 4,310,828 | 1/1982 | Baker | 340/825.65 |
| 4,321,461 | 3/1982 | Walter, Jr. et al. | 340/609 |
| 4,431,533 | 2/1984 | Wrede | 210/87 |
| 4,522,077 | 6/1985 | Koberle | 73/861.63 |
| 4,623,451 | 11/1986 | Oliver | 210/87 |
| 4,708,790 | 11/1987 | Bray | 210/87 |
| 4,918,426 | 4/1990 | Butts et al. | 340/611 |

FOREIGN PATENT DOCUMENTS

| | | | |
|---|---|---|---|
| 340382 | 11/1989 | European Pat. Off. | 210/85 |
| 3104666 | 5/1988 | Japan | 55/270 |
| 3107716 | 5/1988 | Japan | 210/87 |
| 1218612 | 8/1989 | Japan | 210/87 |
| 2206292 | 1/1989 | United Kingdom | 210/85 |

Primary Examiner—Robert A. Dawson
Assistant Examiner—Joseph Drodge
Attorney, Agent, or Firm—Watts, Hoffmann, Fisher & Heinke Co.

[57] ABSTRACT

A fluid filter monitoring system. A flow switch positioned in juxtaposition to a fluid flow path monitors fluid flow and provides an indication during those time periods when fluid is flowing at a rate exceeding a predetermined flow rate through the flow path. A monitoring circuit coupled to this indication provides various audible and/or visible indicators corresponding to detected conditions. The preferred design includes a timer for monitoring the time duration since the filter was installed as well as monitoring the time duration water or other fluids are flowing through the filter. Adjustably settable visible and/or audible indications are provided to indicate when the filter is reaching the end of its useful life as well as when this life period has been exceeded.

18 Claims, 15 Drawing Sheets

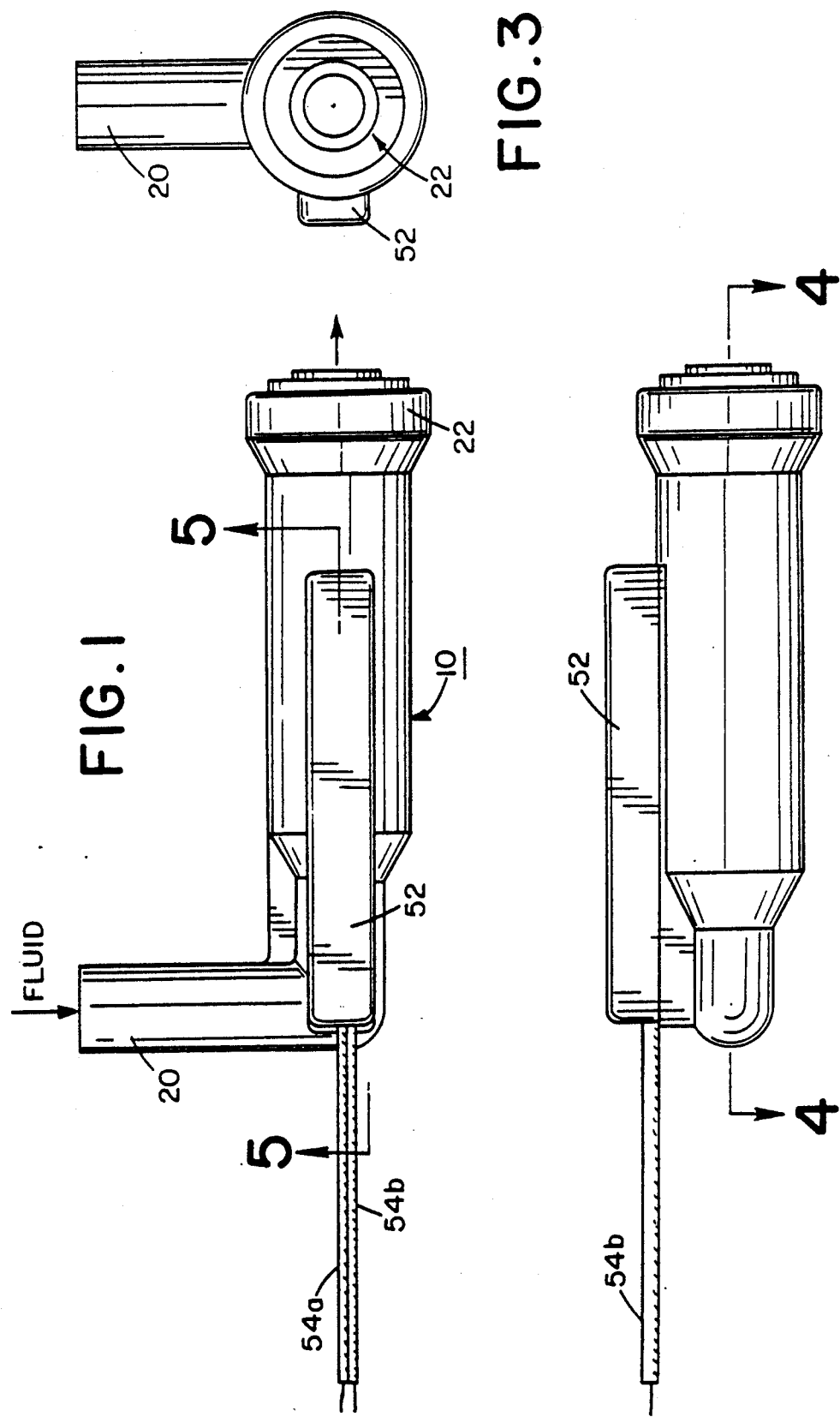

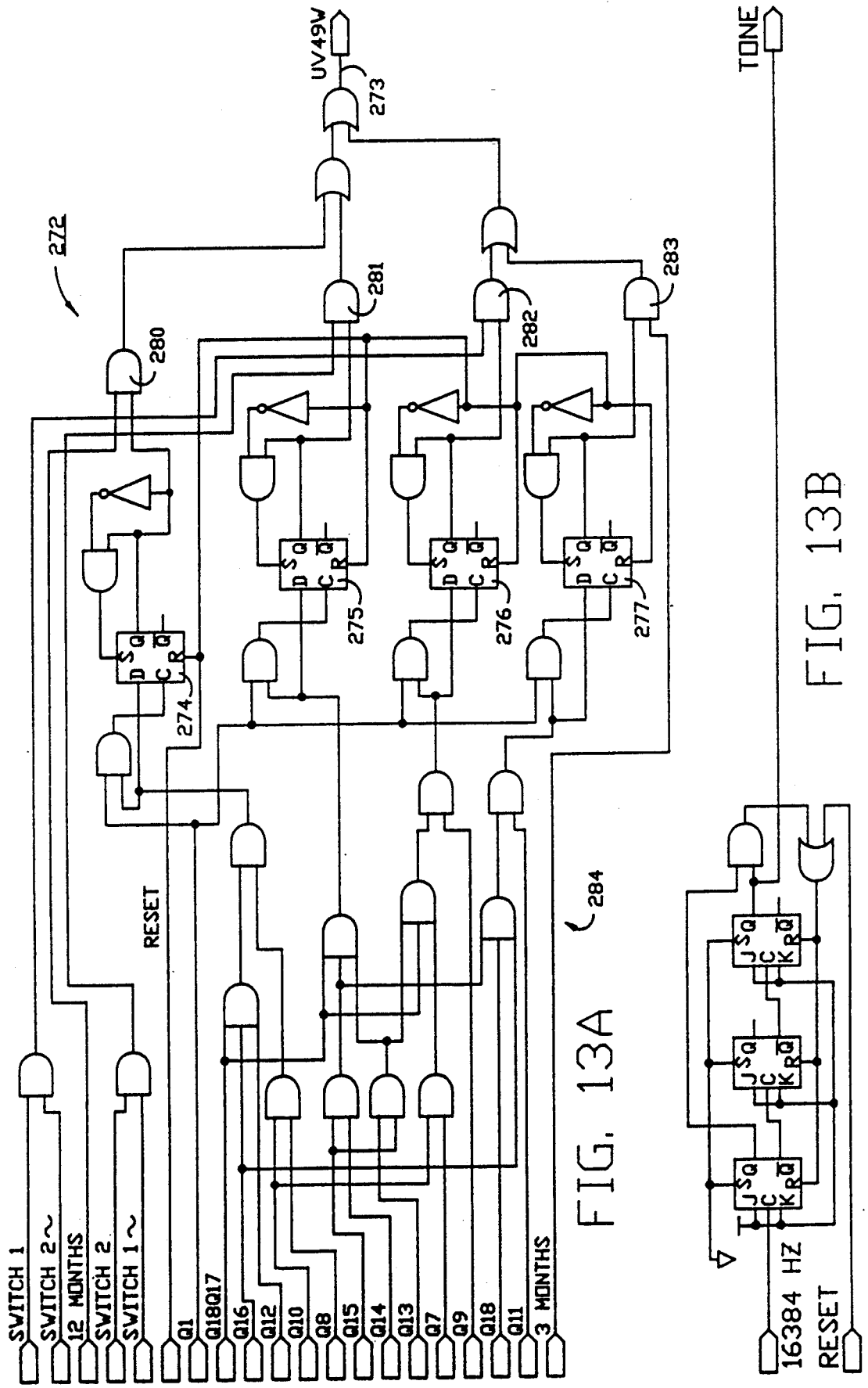

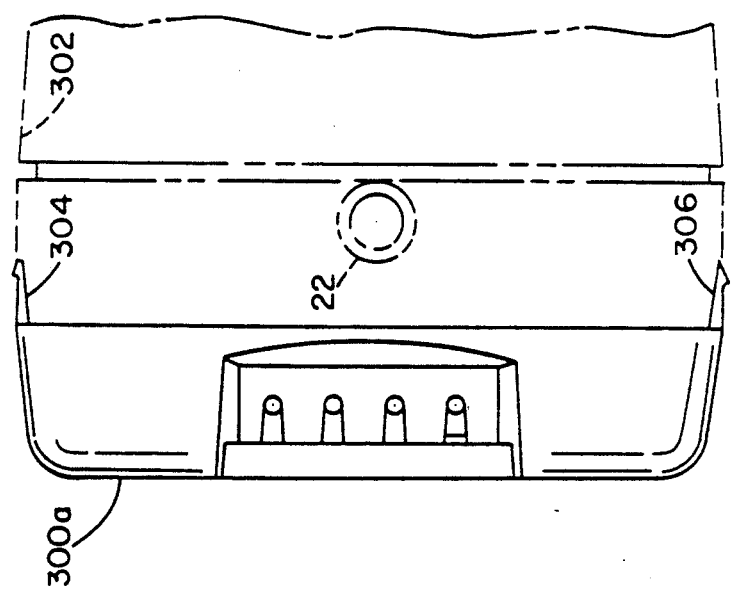
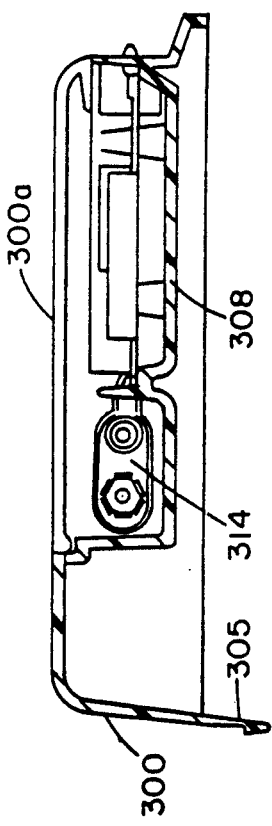
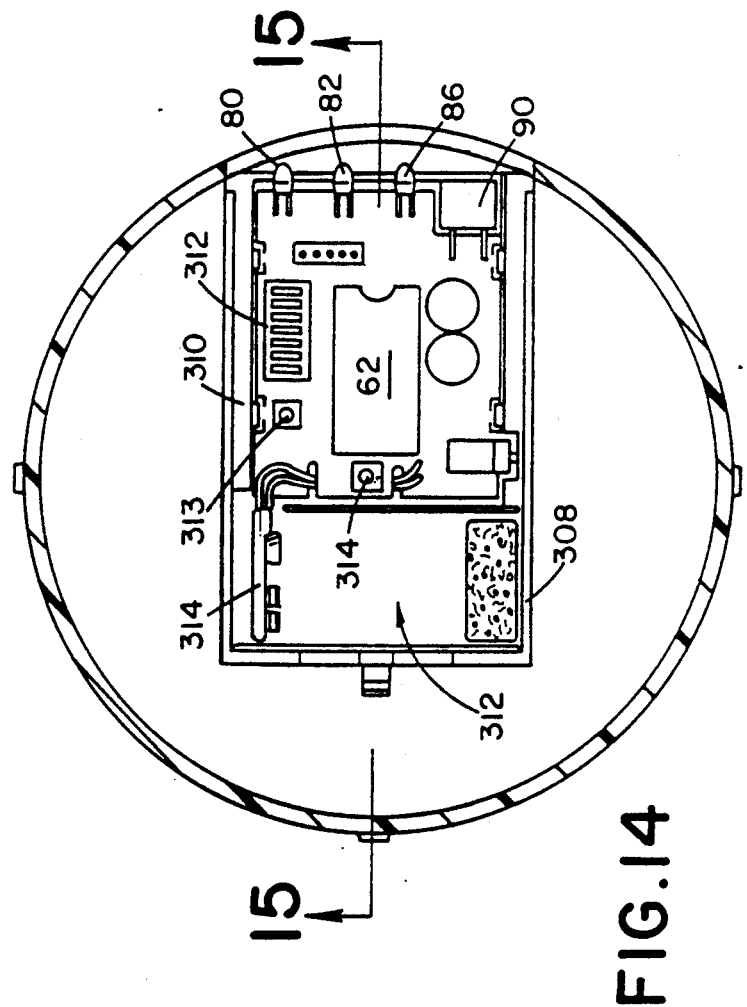

FILTER CONDITION INDICATOR HAVING MOVEABLE SENSOR AND AGGREGATE FLOW COUNTER

FIELD OF THE INVENTION

The present invention concerns method and apparatus for sensing the condition of a fluid filter placed in a fluid flow path. One specific application of the invention monitors a filter that is positioned in a water delivery conduit upstream from a household faucet.

BACKGROUND ART

With use fluid filters become clogged and lose their effectiveness. Periodic filter inspection to determine the status of the filter is required in most filter applications. Typically, the filter is removed from a fluid flow path and physically inspected. If dirt or other materials have accumulated to clog the filter, the filter is replaced.

Certain applications make the routine inspection of the filter condition unsatisfactory due to the complexity in performing the inspection. If due to the construction and use of the filter, routine inspection becomes more difficult, other techniques for determining the filter status are required.

Techniques are known in the prior art for determining the condition of a filter without actually removing the filter from its fluid flow path. U.S. Pat. No. 4,272,368 to Foord et al. relates to a technique for monitoring the condition of a filter. The technique involves the monitoring of a pressure difference across the filter. In the event a specified pressure differential is sensed this pressure differential is assumed to be caused by a clogged filter. Techniques such as the one disclosed by Foord et al. require pressure sensors to be installed on opposite sides of the filter. This can be expensive and may not be justified depending upon the filter application.

U.S. Pat. No. 4,708,790 to Bray discloses a different filter monitoring system. This system monitors fluid flow rates and associates a clogged filter with a reduced flow rate. More specifically, when the flow rate through the filter drops below a specified threshold level, a fluid flow path is adjusted so that the filter can be cleaned and fluid again routed through the regenerated filter.

Such a flow rate sensing system is appropriate so long as fluid flows through the filter at a constant rate. For a system where variable flow rates are anticipated, however, such a system is ineffectual. In addition, the use of sophisticated flow meters for monitoring a filter condition is too expensive for many applications.

DISCLOSURE OF THE INVENTION

The present invention concerns a fluid monitoring system for use in monitoring a filter condition. The disclosed monitoring system is inexpensive to implement, yet is accurate and can compensate for different fluid flow rates and filter types.

In accordance with one aspect of the invention a sensing apparatus is provided for monitoring a condition of a filter and providing an indication of the condition of the filter. This system includes a flow sensor that provides an indication when fluid flows through the filter. A flow timer monitors the indication from the flow sensor and provides a timer output indicative of an accumulated flow period. When the accumulated flow period exceeds a predetermined threshold flow period, a telltale is activated in response to a timer output to provide an indication of the filter condition.

In accordance with a preferred embodiment of the invention the telltale includes a light, preferably a light emitting diode, which can be pulsed on and off to indicate filter condition. An alternate audible warning is also provided in one embodiment of the invention. One use of the invention is for monitoring the condition of a water filter that filters water delivered by a household faucet. The flow sensor is a simple on/off switch responsive to flow rates above a threshold level.

In addition to monitoring the flow of water through the faucet, one embodiment of the invention includes an ultraviolet (UV) light for treating the water and a sensor for monitoring the ultraviolet light and providing an indication if the UV light is not sensed.

Another aspect of the invention is the use of a second timer for monitoring the total time period since the filter was initially installed. By way of example, the second timer can be set to activate a light emitting diode after the filter has been installed for one year. The second timer operates independently from the first flow dependent timer. High filter use can cause light emitting diode actuation before the one year elapses.

In the embodiment wherein a UV light treats the water a third timer monitors how long the UV light has been installed and provides a warning when this sensed time period exceeds a specified time limit.

From the above, one object to the invention is seen to be a sensor for monitoring the condition of a fluid treatment filter wherein the condition is correlated to the time period of fluid flow through the filter. This and other objects, advantages, and features of the invention will become better understood from the accompanying detailed description of a preferred embodiment of the invention which is described in conjunction with the accompanying drawings.

BRIEF DESCRIPTION OF THE DRAWINGS

FIG. 1 is a side elevation view of a flow switch assembly for monitoring fluid flow;

FIG. 2 is a plan view of the FIG. 1 flow switch assembly;

FIG. 3 is an end elevation view of the FIG. 1 flow switch assembly;

FIG. 13A is a schematic of a circuit for generating a signal when a UV filter used in one embodiment of the invention has been in use all but three weeks of its useful life;

FIG. 13B is a schematic of a tone generation circuit used to drive an audible alarm;

FIG. 14 is a partially sectioned view showing a mounting assembly for electronics and LED indicators for indicating the status of the filter;

FIG. 15 is a sectional view as seen from the plane defined by the line 14—14 in FIG. 13; and FIG. 16 is a side elevation view of the FIG. 13 mounting assembly.

BEST MODE FOR PRACTICING THE INVENTION

Figure 4:
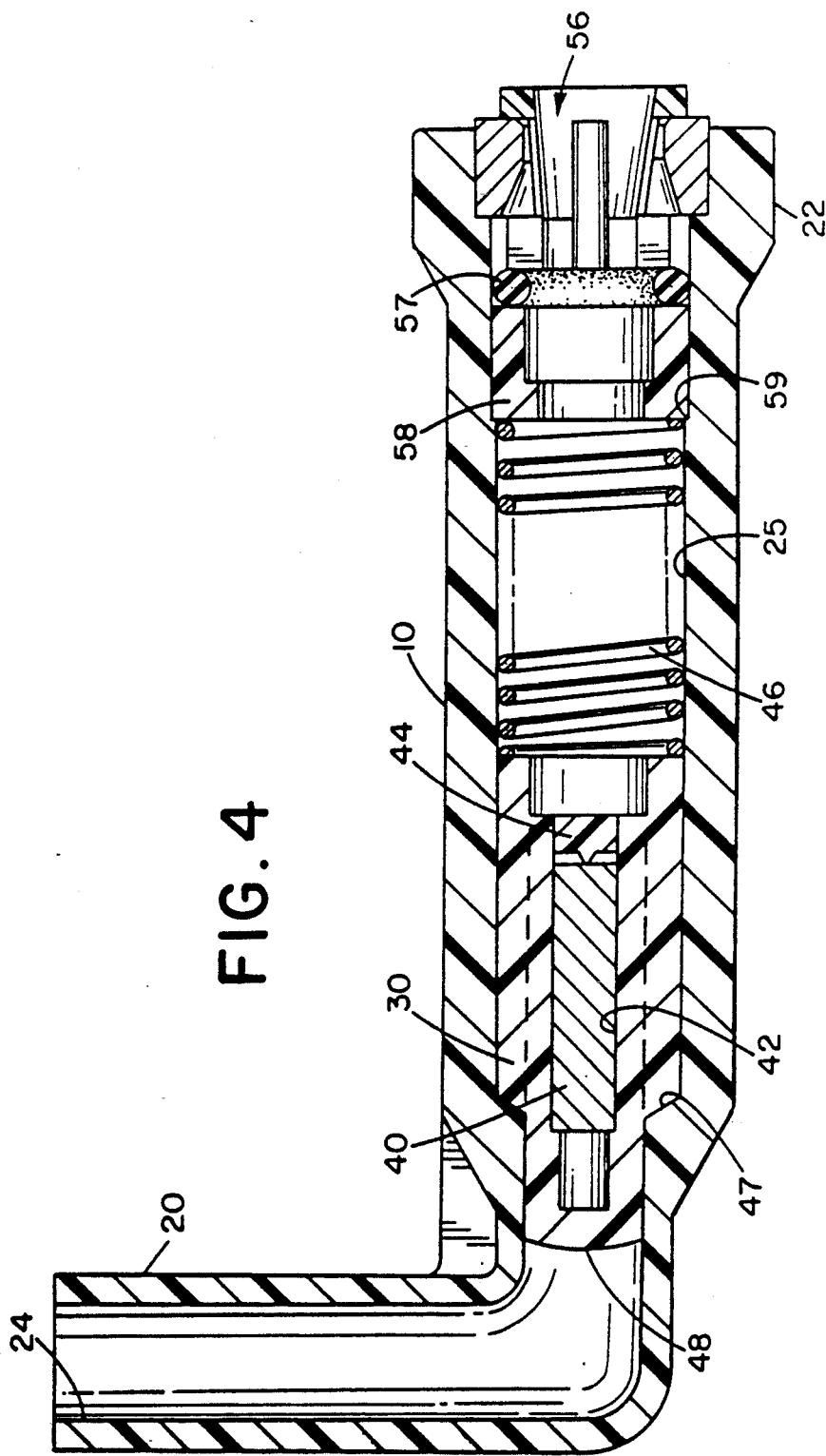
FIG. 4 is a view as seen from the plane defined by the line 4—4 in FIG. 2.
Figure 5:
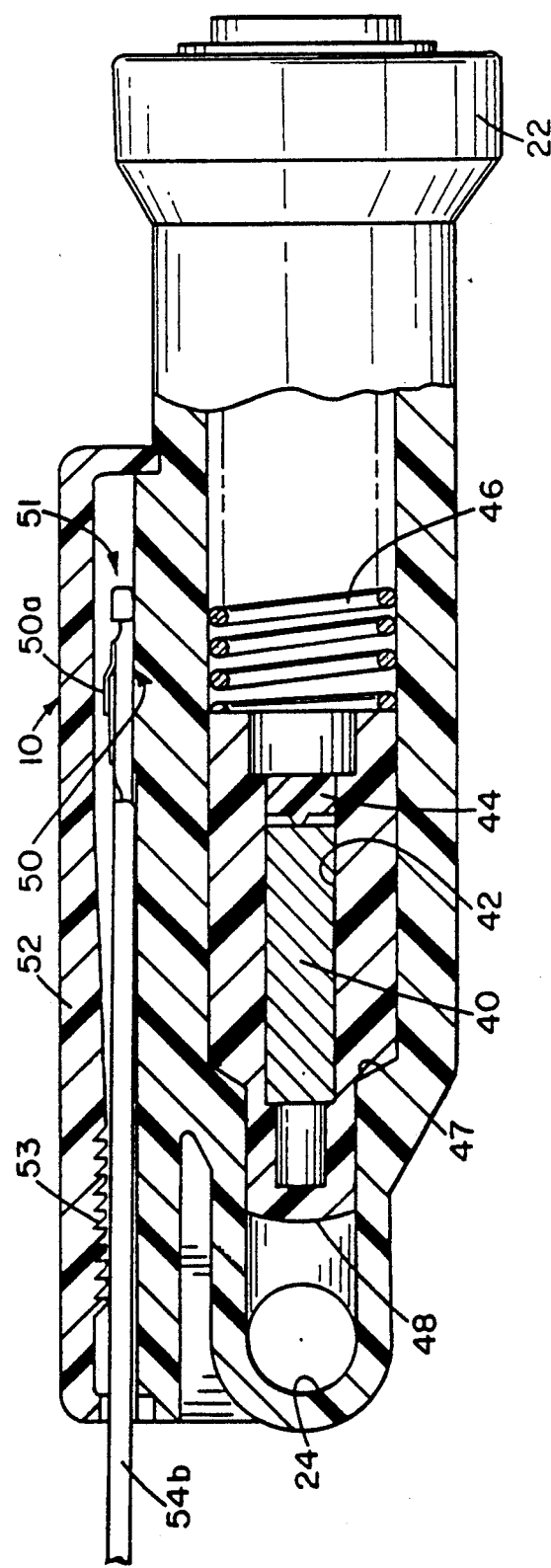
FIG. 5 is a view as seen from the plane defined by the line 5—5 in FIG. 1.

Turning now to the drawings, one embodiment of the invention is described for use in monitoring the condition of an activated charcoal filter used to extract contaminates from water delivered to a faucet. This filter is referred to as a carbon filter. The system includes a fluid flow sensing module 10 (FIG. 1), a circuit 12 (FIG. 6A) for monitoring an output from the fluid flow module 10 to determine a status of a filter, and an indicator assembly 14 (FIGS. 14-16) for providing a visual and/or audible indication concerning the status of the filter.

Flow Sensor

In one embodiment of the present invention the flow sensing module 10 is inserted into a water flow path upstream from a standard faucet and downstream from an activated charcoal filter (not shown). The flow sensing module 10 has an inlet 20 coupled to an output from the charcoal filter. An outlet 22 mates with existing plumbing leading to the faucet. The apparatus of the invention is intended to be user installable and in such an application, the home owner or other user disconnects the existing water carrying conduit leading to the faucet and installs a canister or container that supports both the filter and the flow sensing module 10 into the water flow path. The outlet 22 mates with the inlet to the water faucet. When the faucet is opened water that has been filtered enters the inlet 20, passes through the flow sensing module 10 to the outlet 22, and into the faucet.

The preferred flow sensing module 10 includes a plastic housing fabricated using an injection molding process. The inlet 20 to the flow sensing module defines an elongated, generally cylindrical passage 24 (FIG. 4) that experiences a 90 bend and opens into a larger diameter passage 25.

A flow sensor assembly 30 housed within the module 10 moves back and forth within the module 10 to provide an indication of when water is passing through the module 10 to the faucet. A magnet 40 fixed within a cavity 42 in the flow sensor assembly 30 by a plug 44 moves back and forth within the module 10 as the flow sensor assembly 30 moves.

With no fluid flowing through the module 10, a compression spring 46 biases the flow sensor assembly 30 against a seat 47 where the passage 24 widens to the width of the passage 25. When water first begins to flow it enters the module 10 at the inlet 20 and encounters a surface 48 that restricts the passage 24. The flow path for water through the restriction is narrow enough that very little water flow will cause the flow sensor assembly 30 to move within the passage 25. A reed switch 50 is supported within a cavity 51 defined by a separately molded, elongated switch support 52. During assembly of the module 10 the switch support 52 is attached to the main body of the module 10 and secured in place by ultrasonic welding or the like.

As the magnet 40 moves within the module 10 a magnetic field in the vicinity of the magnet 40 closes a contact 50a of the reed switch 50 and completes a circuit via conductors 54a, 54b to provide an indication that water is flowing through the module. Serrations 53 in the wall of the switch support 54 provide strain relief to the conductors 54a, 54b so that bending of the conductors 54a, 54b outside the module 10 does not disconnect the conductors from the switch 50. So long as the water flows through the module at a sufficient rate, the force of water contacting the flow sensor assembly surface 48 compresses the spring 46 and holds the magnet 40 is a position to maintain the switch contact 50a closed.

The module outlet 22 (FIG. 4) supports a conventional quick disconnect fitting 56 including an 0 ring 57 that prevents water from leaking from the interface between the fitting 56 and a flexible conduit (not shown) leading to faucet. The fitting 56 is commercially available from John Guest U.S.A., Inc., 55 Haul Rd., Wayne, N.J. 07470. A plastic insert 58 seats against a lip 59 in the module 10 and is biased against the lip as the O-ring 57 is compressed. This insert 58 traps the spring 46 within the passageway 25.

Monitoring Circuit 62

Figure 6:
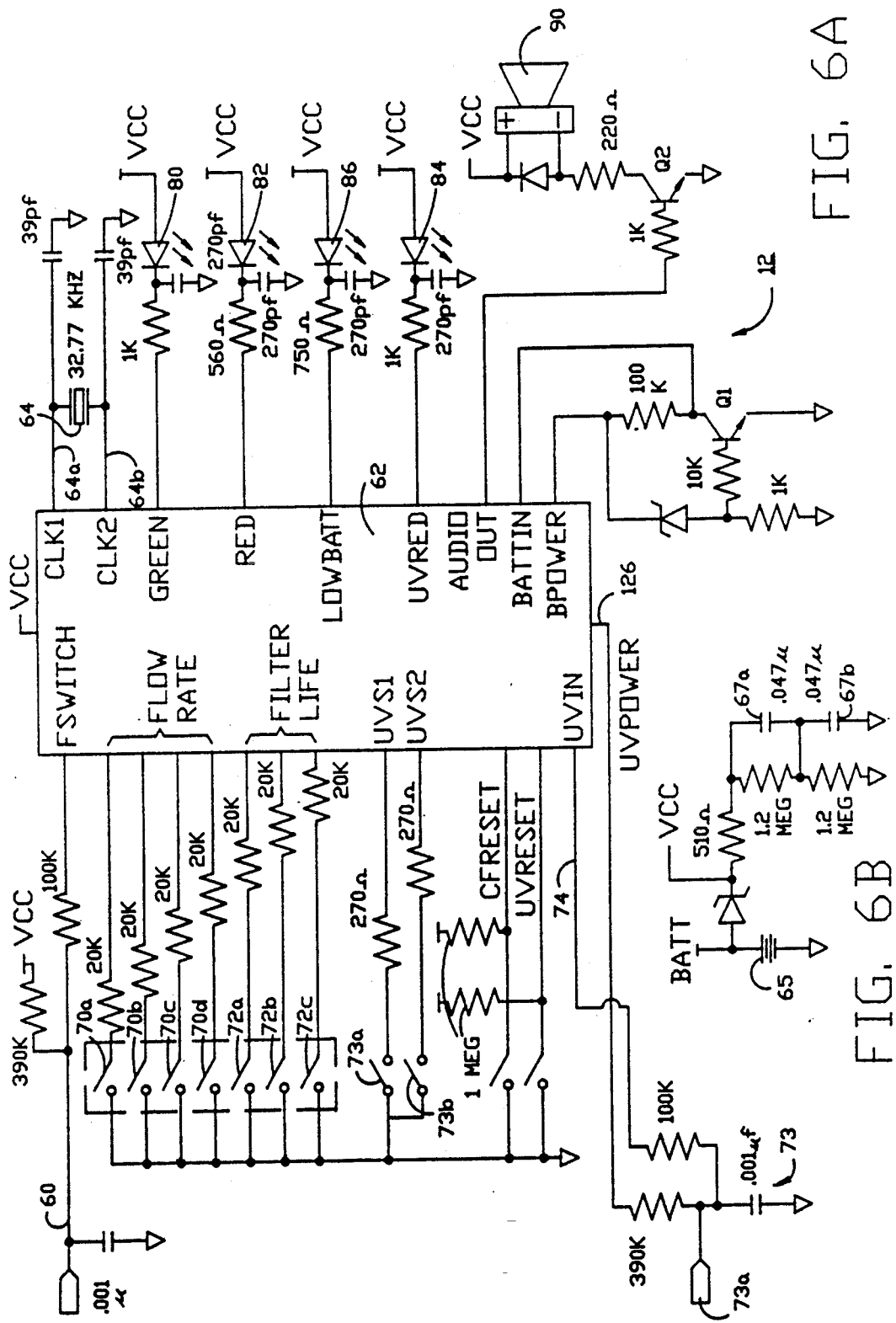
FIG. 6A is a schematic of circuitry, including a custom large scale integrated circuit, for monitoring fluid flow through a filter as well as keeping track of time periods of filter installation.
FIG. 6B is a schematic showing a battery energization circuit including means for maintaining data concerning the filter status when the battery is changed.

When the reed switch contact 50a closes, an input 60 to the circuit 12 depicted in FIG. 6A is pulled low. A custom integrated circuit 62 monitors the time fluid flows through the module 10 based on the state of the input 60 and gives an indication of useful remaining filter life.

Figure 7:
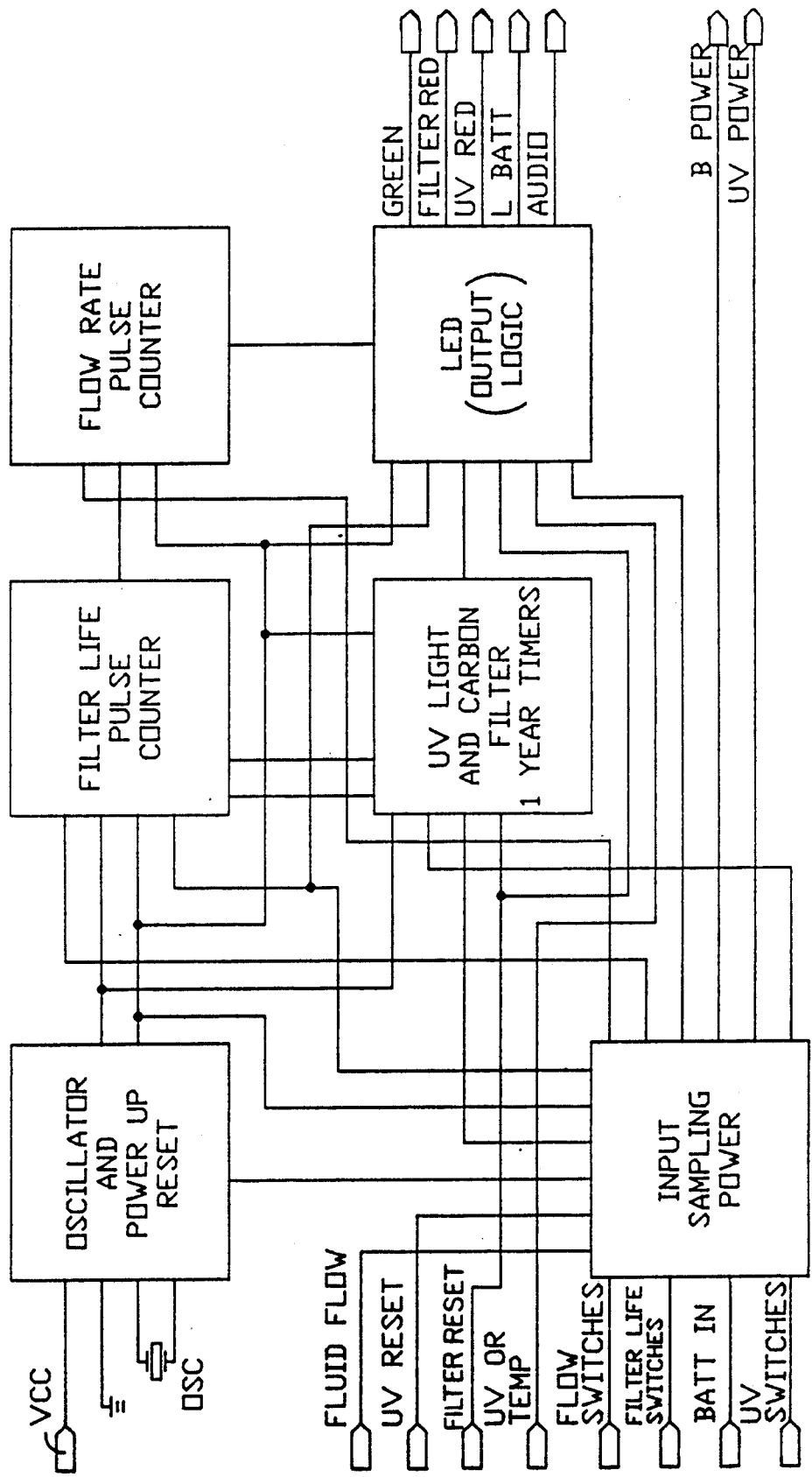
FIG. 7 is a functional schematic of a custom large scale integrated circuit included in the FIG. 6 circuit for monitoring fluid flow through a filter.

FIG. 7 is an overview schematic showing the general functioning of the integrated circuit 62. A series of filter life and flow rate selector switches are adjusted either at the factory or by the user and determine the manner in which pulses from a constant frequency clock are counted by a counter within the circuit 62. As milestone counts are reached by the counter indications that the filter life has been used are provided by activating a series of light emitting diodes and/or audible outputs.

In addition to monitoring fluid flow through the module 10, the integrated circuit 62 includes a clock to keep track of elapsed time since the last filter installation. The preferred system detects the passage of a specified time period since filter installation and warns the user as this time approaches and then exceeds a specified threshold.

In an alternate embodiment of the invention, an ultraviolet light is also used to treat water before it reaches the faucet. In this embodiment, the integrated circuit 62 also senses the presence of a ultraviolet light and monitors the elapsed time since UV light installation. In the event the ultraviolet light is not functioning, an indication of this sensed condition is provided. Furthermore, the elapsed time since ultraviolet light installation is monitored and a second indication is provided as this monitored time approaches and then exceeds a predetermined threshold.

All necessary timing signals are obtained from a crystal oscillator 64 (FIG. 6A) having an input 64a, and an output 64b coupled to the integrated circuit 62. These oscillation input signals are accumulated by timing circuits (discussed below) that begin counting pulses upon receipt of a power on reset input to the circuit 62. A power on reset is accomplished when the user installs a battery 65 (FIG. 6B) which provides energization signals to the circuitry depicted in FIG. 6A. Two additional reset inputs are user actuated and reset timers for monitoring the time since installation of a carbon filter used in filtering the water and a UV source used in treating the water in the alternate embodiment of the invention employing this function.

Turning to FIG. 6B, when the battery 65 is installed a supply voltage VCC is supplied to the circuit 62. The VCC supply voltage is coupled across two capacitors 67a, 67b. If the battery 65 is replaced the capacitors 67a, 67b maintain their charge to power the circuit 62 for at least 15 minutes. This allows the battery to be replaced without loss of data relating to filter life that is maintained by the circuit 62.

A plurality of inputs to the circuit 62 are user selectable depending upon the lifetime of the filter and the flow rate the filter is designed to accommodate. There are 16 user or factory adjustable flow rates in the disclosed design ranging from 0.1 to 1.6 gallons per minute of water flow through the filter. These different flow rates are adjustable by setting four switches 70a-70d coupled to the integrated circuit 62.

Eight different filter capacities are input by adjusting the setting of three switches 72a-72c. These settings allow the filter capacity to be adjusted to the amounts of 100, 200, 500, 750, 1,000, 2,000, 5,000, and 10,000 gallons of water flow before replacement. Based upon a particular setting of the switches 70a-d, 72a-c to the integrated circuit 62, a certain number of pulses created by a master oscillator circuit within the integrated circuit 62 are passed to a counter or accumulator circuit. An end of filter life indication is provided when the counter or accumulator reaches a specified count total. By adjusting the lifetime or flow rate, the number of these pulses that are counted per unit time is adjusted.

In the embodiment of the invention wherein the water delivered by the faucet is treated with an ultraviolet light, the presence of this light is sensed. In one embodiment a UV sensor is constructed using a resistor-photocell voltage divider 73. In the presence of ultraviolet light, the resistance of a photocell 73a is reduced so that a UV input 74 to the circuit 62 provides an indication of the presence of this light. If the UV light is not sensed the integrated circuit 62 provides an appropriate warning indication. In accordance with an alternate design a thermistor rather than a photo detector is used in the voltage divider 73. If the UV light is functioning the thermistor is at an elevated temperature. In either embodiment the circuit 62 is apprised of the presence of a functioning UV light.

The invention provides a prewarning signal when the carbon filter approaches the end of useful life. A green output LED 80 is pulsed on and off whenever water flow is sensed and the usage of the filter is less than approximately 90% of its total useful lifetime. Between 90% and 100% of the useful life of the carbon filter, a red carbon filter LED 82 is pulsed on and off as water flows through the module 10. Once filter usage reaches 100% of the useful life, the carbon filter LED 82 is illuminated continuously during water flow.

In an embodiment having a UV sensor a second red LED 84 provides an indication of ultraviolet light treatment of the water passing through the module 10. Once the ultraviolet light reaches 90% of its usage, the red LED 84 is pulsed whenever water flows through the module 10. When the ultraviolet light reaches 100% of its useful life, it is illuminated continuously when water flows.

The circuit 62 tests for an indication of low battery voltage by sensing collector voltage on a transistor Q1 (FIG. 6A) that is energized by the circuit 62 each time water flow is sensed. When the collector voltage falls below a threshold, the circuit 62 energizes an additional light emitting diode 86. Receipt of a low battery indication causes the circuit 62 to pulse the LED 86 on and off.

In one embodiment of the present invention, in addition to visual indications on the LEDs 80, 82, 84, 86 an audible output warning is generated in response to various sensed conditions concerning filter life. In this embodiment, a loud speaker 90 coupled to an output from the integrated circuit 62 is activated to beep for one half second at the beginning of sensed water flow whenever the filter and/or UV light is within the warning (exceeds 90% of usage) range. One beep is also generated if a low battery condition is sensed. Two beeps are generated when either the carbon filter or ultraviolet light has exceeded their useful lives. In addition, the two beeps are generated in the event no ultraviolet light is sensed by the voltage divider circuit 73.

Data Acquisition

Figure 8:
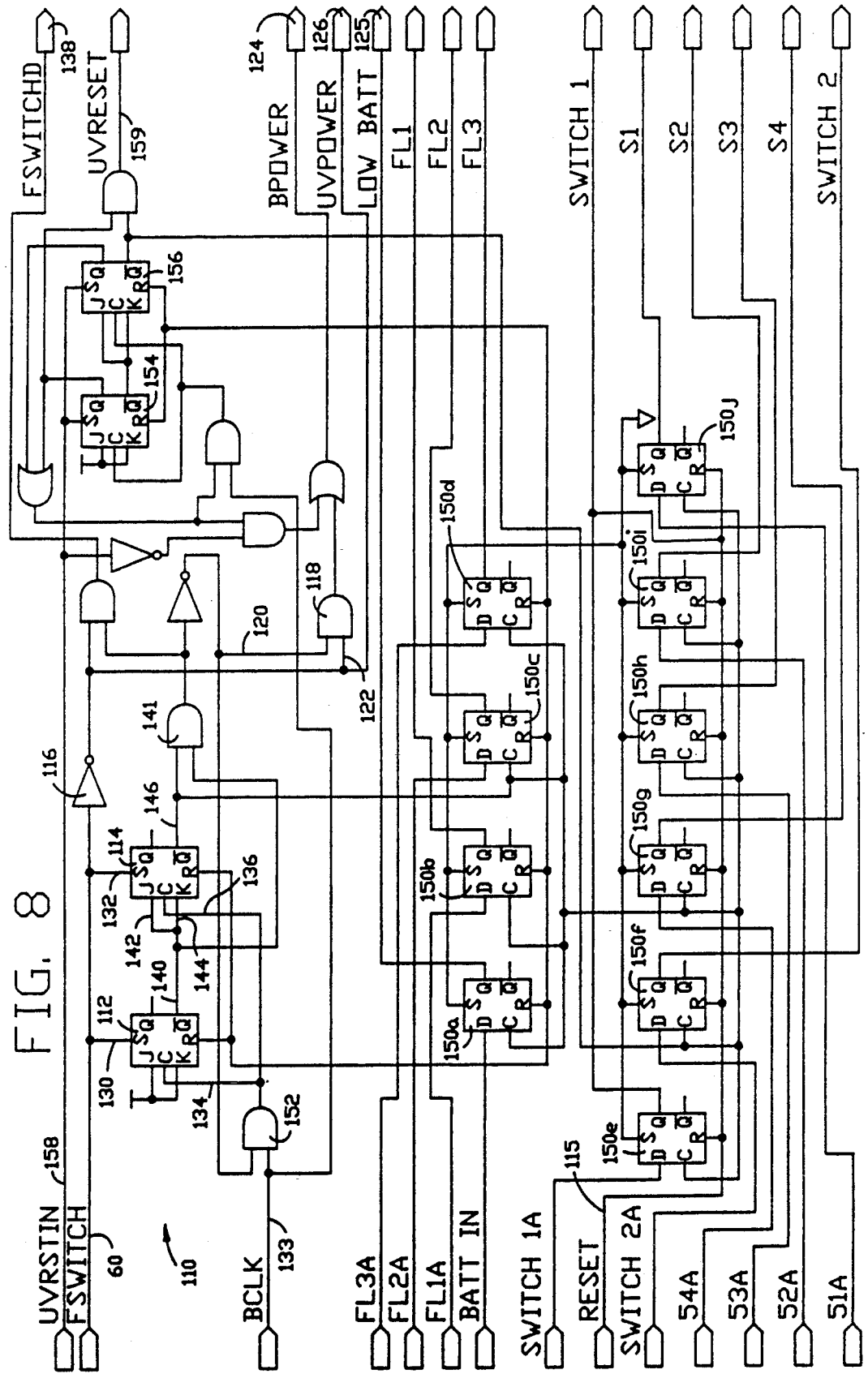
FIG. 8 is a schematic of a data acquisition portion of the custom integrated circuit depicted in FIG. 6.

FIG. 8 depicts a data acquisition portion of the integrated circuit 62. The circuit 62 must operate on a 9 volt alkaline battery for periods in excess of one year. To help conserve battery life, every time the flow switch input 60 goes low in response to water flow through the faucet, data is latched into the circuit 62 and used in determining an appropriate timer and light emitting diode energization response to such flow. At the top of FIG. 8 a counter circuit 110 constructed using two flip flop circuits 112, 114 performs the steps of powering up inputs to the circuit 62, latching data into the FIG. 8 circuitry, powering down the inputs, and entering a wait state for receipt of a next subsequent flow switch signal at the input 60.

At the lower left portion of FIG. 8 a power on reset signal at the input 115 labeled RESET causes the counter 110 in the upper left portion of the circuit to be reset and enter a wait state. The RESET input goes momentarily high when the battery 65 is first installed by the user and otherwise remains low.

Upon receipt of a low input at the FSWITCH input 60 to the circuit (meaning the reed switch contact 50a has been closed by water flowing to the faucet) this low signal passes through an inverter 116 and is coupled to an AND gate 118 having one input 120 which is already high. The receipt of a second high input 122 to this AND gate 118 causes a BPOWER output 124 from the FIG. 8 circuit to go high. As shown in FIG. 6A, when the BPOWER output goes high the transistor Q1 will turn on if the BPOWER is high enough. This will ground the BATTIN input. If the battery voltage drops (indicating the battery should be replaced) the BPOWER signal will no longer turn on the transistor Q1 and the BATTIN signal will be the same as BPOWER. BATTIN is used to test the battery voltage and causes the circuit 62 to give a low battery indication.

The BPOWER output 124 is also tied to a series of pull up resistors (not shown) inside the integrated circuit 62 coupled to the switches 70a-70d, 72a-72c. The BPOWER signal thereby activates inputs that are read by the circuit 62 for updating the status of the filter as water flows.

The status of a UVPOWER output 126 needed to energize the divider circuit 73 sense the pressure of a UV light and in one embodiment of the invention is also controlled by receipt of a low FSWITCH input. As seen in the circuit diagram (FIG. 8) this output 126 also goes high upon receipt of a low input at the FSWITCH input 60.

When the FSWITCH input 60 goes low the set inputs 130, 132 to the flip flops 112, 114 also go low. A next subsequent clock pulse at a BCLK input 133 to the circuit toggles the clock inputs 134, 136 to the two flip flops 112, 114 and causes the $\overline{Q}$output 140 from the flip flop 112 to go high. The BCLK input 133 is a 50% duty cycle signal having a frequency of 128 hertz. The output 140 is coupled to one input of an AND gate 141 whose other input is tied to the $\overline{Q}$output of the flip flop 114 which is held low. The output of the AND gate 141 thus remains low, keeping a FSWITCHD output 138 from the circuit low.

The $\overline{Q}$output 140 is also coupled to the J and K inputs 142, 144 of the second flip flop 114 so that when the output 140 goes high it enables the flip flop 114 for receipt of a next input at the BCLK input 133. The next BCLK pulse therefore toggles the flip flop 114 and causes its $\overline{Q}$output 146 to go high.

The high $\overline{Q}$output 146 from the flip flop 114 toggles the clock input to a number of flip flops 150a-150k, causing them to acquire data presented at their D inputs. More specifically these flip flops 150a-150k acquire data appearing at three filter life inputs, FL3A, FL2A, FL1A, the low battery input BATTIN, the four flow rate inputs S1A, S2A, S3A, S4A and switch inputs SWITCH1A, SWITCH2A used for the embodiment of the invention having an ultraviolet light for treating the water.

The clock signal BCLK that caused the data to be acquired by the flip flops 150a-150k also toggles the flip flop 112 to bring its $\overline{Q}$output 140 low. Since one input to the AND gate 141 remains low the FSWITCHD output remains low. The next BCLK signal clocks only the flip flop 112, causing the $\overline{Q}$output 140 to go high so that both inputs to the AND gate 141 are high. This causes the FSWITCHD output to go high signaling the remaining portions of the circuit 62 that a) the flow switch contact 50a is closed indicating water is flowing through the faucet and b) data has been latched into the flip flops 150a-150k. An AND gate 152 at the BCLK input 133 is also disabled so that no further BCLK signals reach the two flip flops 112, 114 until the FSWITCH input 60 goes high and then low again as the faucet is closed and then re-opened.

Two flip flops 154, 156 are analogous in operation to the two flip flops 112, 114 but are used in an embodiment of the invention utilizing an ultraviolet filter for treating water passing through the faucet. As seen in FIG. 8, a UVRSTIN input 158 serves an analogous function to the FSWITCH input 60 for the two flip flops 112, 114. When the UVRSTIN input 158 activates the flip flops 154, 156 the BCLK input 133 causes the flip flops 154, 156 to generate an output 159 as well as acquire data concerning two switch settings, SWITCH1A, SWITCH2A that designate a UV light lifetime. The UVRSTIN input 158 is activated by a user accessible switch and is intended to be activated when the UV filter light is changed. Each time the filter light is changed, the flip flops 154, 156 acquire data at the SWITCH1A, SWITCH2A inputs and utilize this data for determining the remaining life available for the UV filter.

Flow Timer Selector Circuits

Figure 9A:
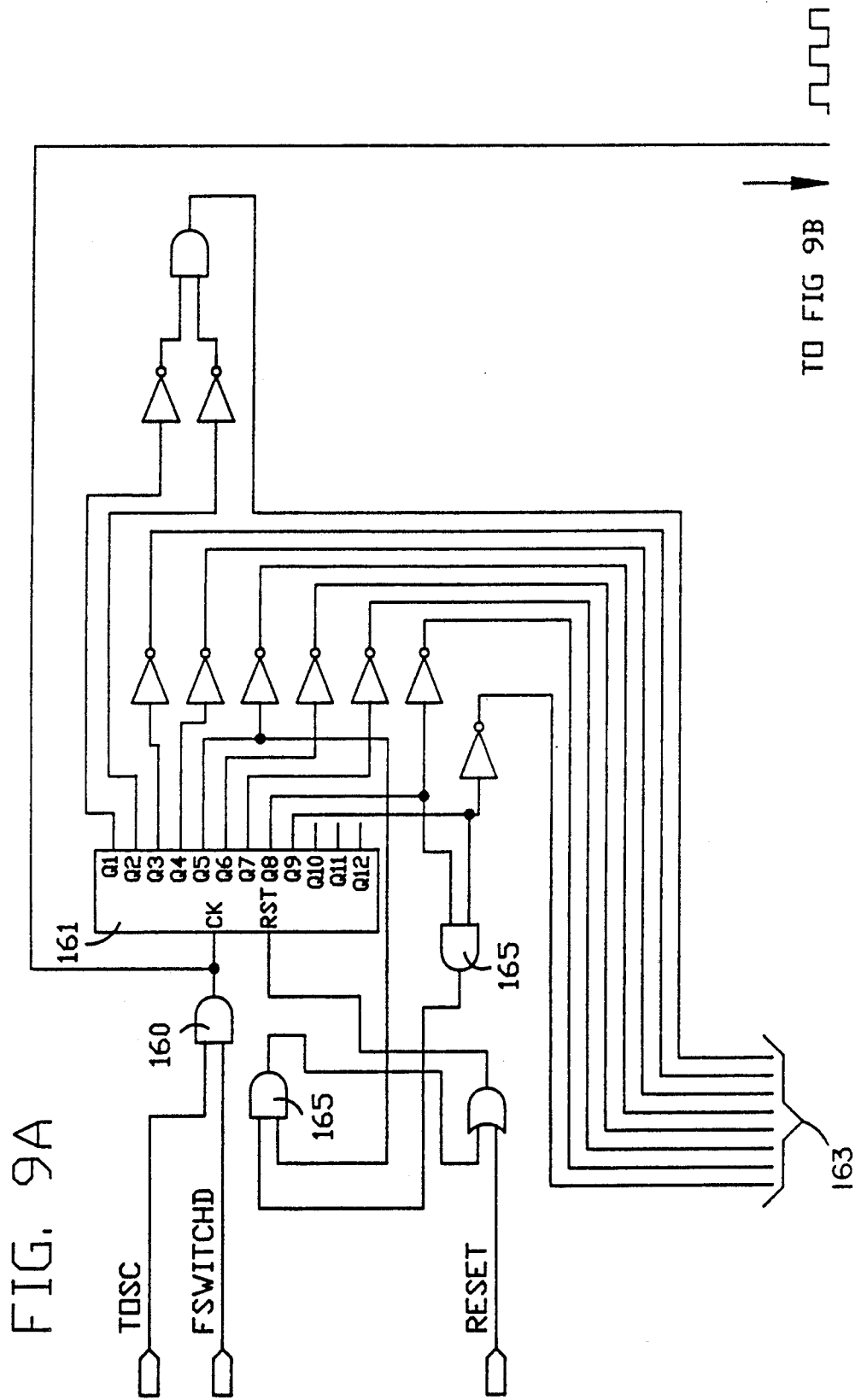
FIGS. 9A and 9B are schematics of a circuit portion of the custom integrated circuit for counting a sequence of pulses based upon a filter life.
Figure 9B:
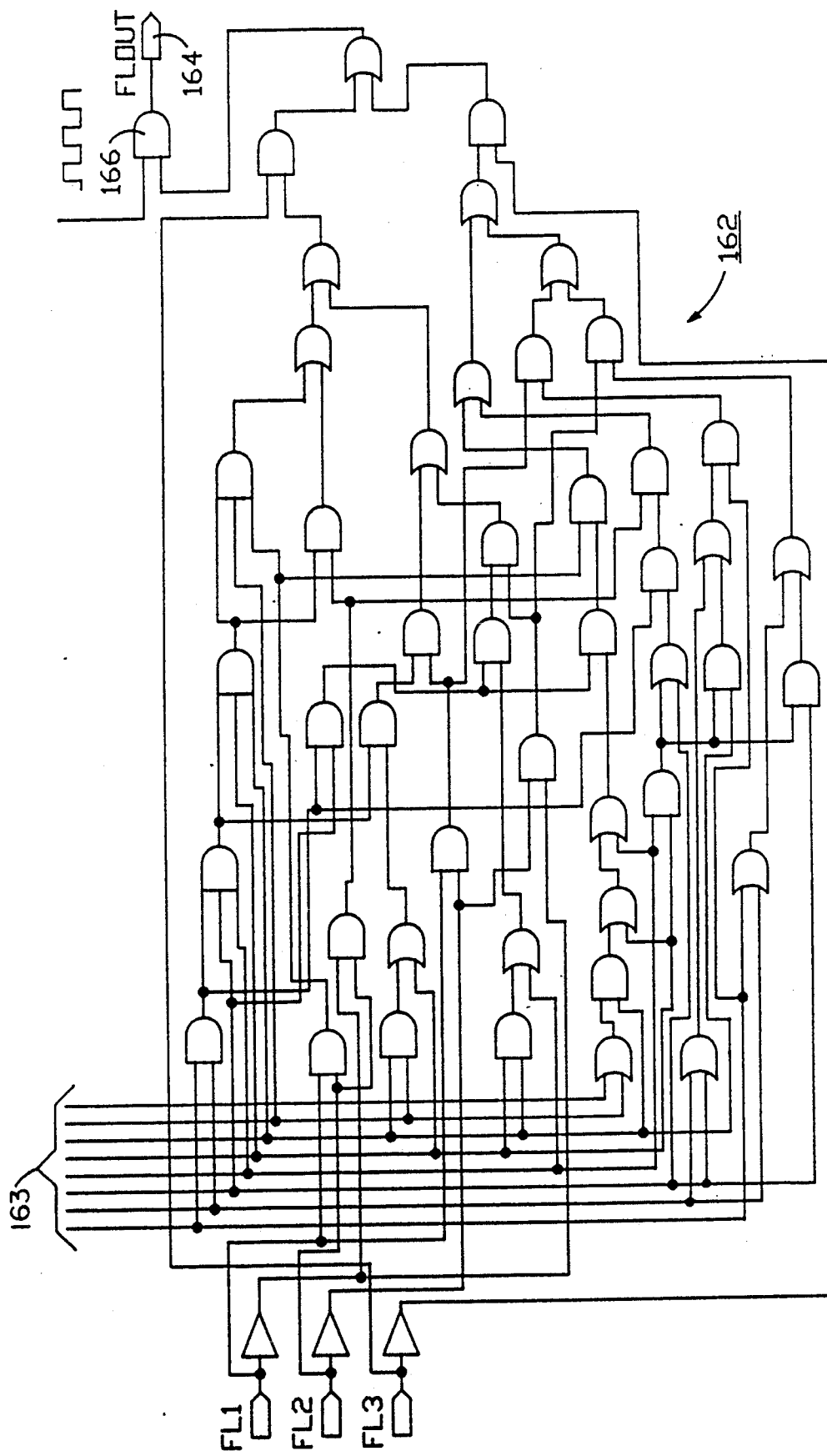
Figure 10:
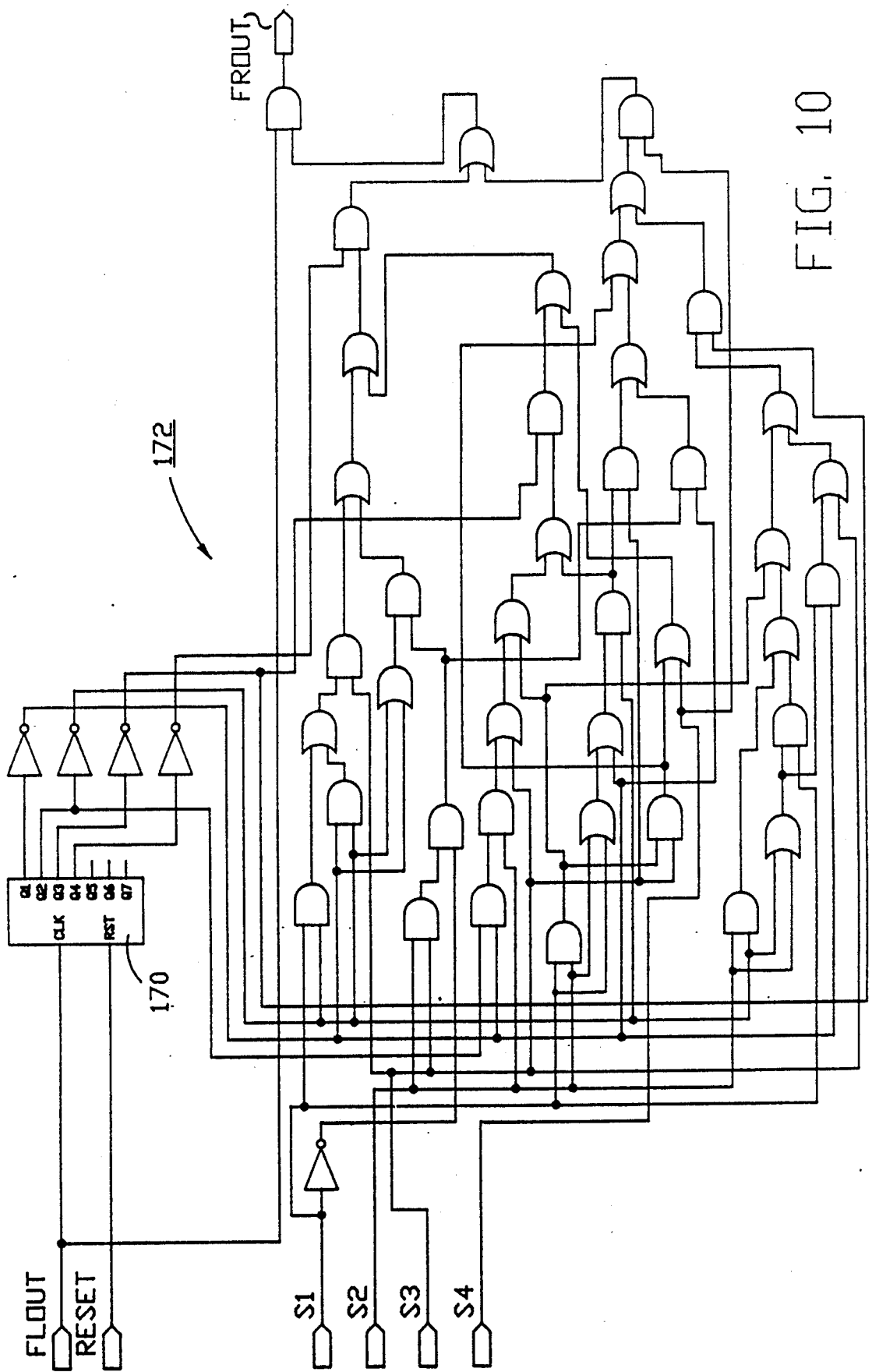
FIG. 10 is a circuit coupled to an output from the FIG. 9B circuit to also count a sequence of pulses wherein the manner of counting is based upon fluid flow rates of fluid passing through the filter.

FIGS. 9A, 9B, and 10 depict circuitry that selects pulses from a train of 4.096 kilohertz, 50% duty cycle pulses (TOSC) and transmits these pulses via the output FROUT (FIG. 10) to a counter depicted in FIG. 11. As noted above, an input from FIG. 8 labeled FSWITCHD indicates when the switch 50 has been closed as the user opens the faucet. Once data has been acquired by the flip flops 150a-150j, the FSWITCHD input enables an AND gate 160 which then transmits the 4.096 kilohertz signal TOSC as a clock input to a twelve stage counter 161. Outputs from the counter 161 are inverted and coupled as inputs 163 to a logic array 162 (FIG. 9B) having an output FLOUT 164. Three additional inputs to the logic array 162 labelled FL1, FL2, FL3 (FIG. 9B) are filter life selections (latched in by the flip flops 150b-150d of FIG. 8) enabling the user to select one of eight different lifetimes. The selected lifetimes vary from 100 to 10,000 gallons as described above.

The filter lifetime valves increase in unequal increments. In the disclosed embodiment of the invention a series of pulses are generated and counted until a specified count is reached. Since the same count is used for all filter lifetimes only certain ones of the series of pulses are counted for filter lifetimes longer than 100 gallons. A specific, unique fraction of the pulses are counted for each of the possible filter lifetimes and the choice of the available lifetime settings (specified previously) required each time increment be represented by a series of 400 pulses to assure each of the filter capacity settings could be timed by counting a fraction of all pulses. Analysis of the various flow rates mentioned previously results in a least common multiple for these flow rates of 400, resulting in the choice for 400 pulses per unit time as the pulse rate of the circuit 62.

The philosophy of the circuit schematic of FIG. 9B is such that for high capacity filters very few of the pulses are transmitted to the output FLOUT. This assures that a counter depicted in FIG. 11 reaches an end of life indication slower for the long filter life situation since a smaller number of pulses per unit time are generated at the output FLOUT 164. In the preferred embodiment, only 4 pulses out of each 400 pulses at the input TOSC are transmitted via the output FLOUT for the 10,000 gallon filter life application. For a 100 gallon filter life selection all 400 pulses are transmitted.

The counter 161 (FIG. 9A) counts from 0 to 399 and then resets to zero due to the operation of two AND gates 165 connected to the Q9, Q8, and Q5 outputs from the counter 161. The logic array 162 (FIG. 9B) determines which of the pulses at the TOSC input are transmitted by an AND gate 166. Each counter cycle has 400 pulses and inputs FL1, FL2, FL3 determine how many pulses reach the output FLOUT. In the 10,000 gallon filter life, for example, the first 4 TOSC pulses are passed by the AND gate 166 and the following 396 are suppressed. In this example the FL1 input is high, FL2 is high, FL3 is high. If the filter life is set at 200 gallons the first 200 pulses are transmitted and the next 200 are suppressed.

FIG. 10 is similar in operation to the circuitry of FIGS. 9A and 9B. In this figure the 4 inputs labeled S1, S2, S3, S4 designate sixteen different flow rates in equal increments from 0.1 gallons per minute to 1.6 gallons per minute. If the flow rate is faster, the FIG. 10 circuit transmits more of the FLOUT input pulses to the output FROUT. A counter circuit 170 at the top of FIG. 10 is a module 16 counter which is reset upon receipt of a RESET input to the circuit and counts all FLOUT pulses. A logic circuit 172 combines the outputs from the module 16 counter and the settings of the S1, S2, S3, S4 inputs (captured by the flip flops 150g-150k) to determine which of the FLOUT pulses to transmit to the FROUT output. For a high flow rate, each of the 16 pulses that clock the counter 170 will be transmitted and for the lowest flow rate of 0.1 gallons per minute only 1 in 16 of the pulses is transmitted to the output FROUT.

Flow Time of Life Counter and LED Control

Figure 11A:
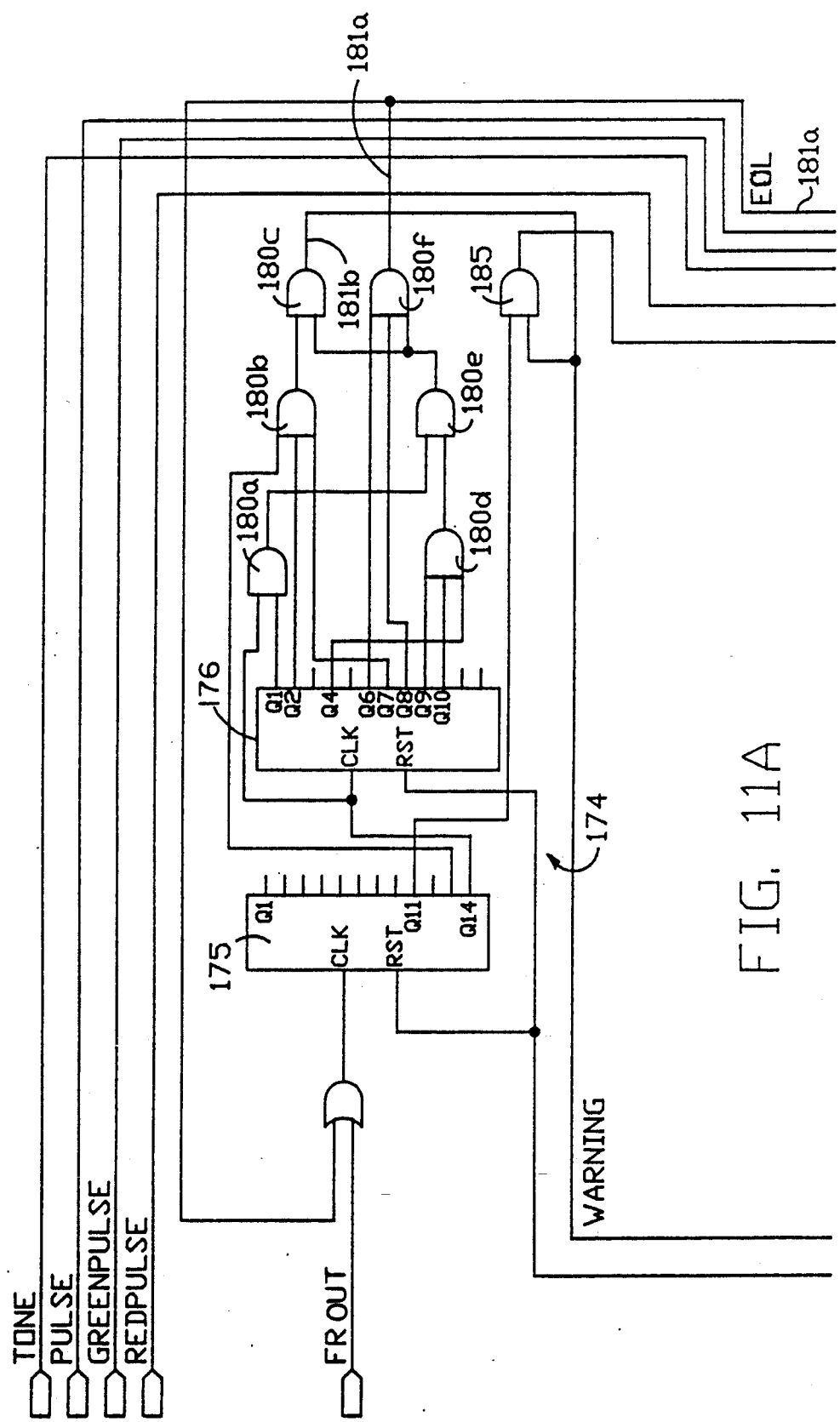
FIGS. 11A and 11B are schematics of is a circuit showing a pulse accumulator and circuitry for activating warning light emitting diodes or activating an audible indication based upon filter usage or accumulated time since filter installation.

FIG. 11A illustrates an accumulator or counter circuit 174 is constructed from two counters 175, 176 which count pulses at the FROUT input to the circuit. The accumulator 174 counts up the pulses that have been passed from the TOSC input to the FROUT output in accordance with the filter life and flow rate data settings read into the flip flops in FIG. 8. Outputs from the accumulator 174 are coupled to a number of AND gates 180a-180f. As the count at the accumulator output changes, the status of inputs to these AND gates changes.

An AND gate 180f generates an end of life signal EOL at an output 181a and an AND gate 180c generates a warning signal WARNING at an output 181b when the filter has reached 90% of its useful life based upon water flow through the filter.

The philosophy for activating the LEDs is that they are activated so long as water flow is sensed. At the left hand side of FIG. 11B a FSWITCHD input provides a high input signal when water flow is sensed. As seen in the right hand portion of the FIG. 11B circuit the FSWITCHD input is coupled to a series of AND gates 182a-182d. High outputs from these AND gates allow signals to be transmitted to the various LED outputs on the right hand portion of the circuit.

In the upper left hand corner of FIG. 11A TONE, PULSE, GREENPULSE, and REDPULSE inputs are seen coupled to the FIG. 11A circuit. The TONE signal is used in creating an audible output and operates at 3.277 kilohertz, or 1/10 of the master clock oscillation frequency. The PULSE input is a 1.024 kilohertz signal having a 50% duty cycle which is used to save battery life by activating the LEDs at a high frequency rather than a steady state. The human eye perceives the 1 kilohertz signal as a constant signal but this energization achieves the aforementioned battery savings. The GREENPULSE input has a 4 second period with a 12¼% duty cycle. The red pulse input has a shorter 2 second period and again, a 12¼% duty cycle. These inputs are seen coupled directly to logic gates (FIG. 11B) which provide the right hand side outputs from the circuit. These gates pass the various signals in response to outputs from the accumulator circuit 174 indicating an appropriate number of pulses have been counted.

Figure 11B:
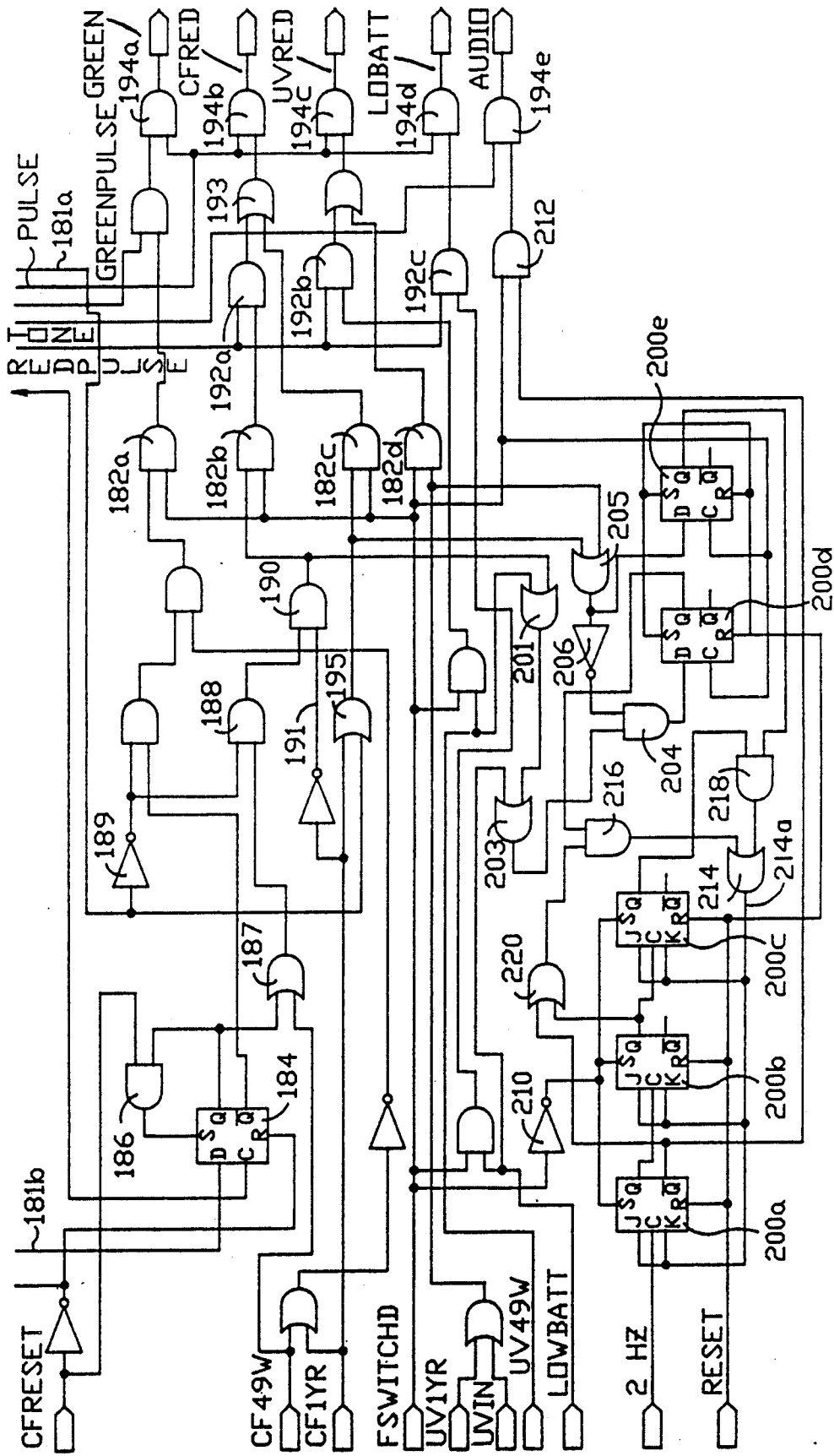

On the left hand side of FIG. 11B a flip flop 184 latches in the warning condition as an output 181b from the warning condition AND gate 180c goes high. The D input to the flip flop 184 goes high and then a clock input delayed by an AND gate 185 (FIG. 11A) causes the Q output of the flip flop 184 to go high. This is latched by a feed back latching AND gate 186 to the flip flop S input and coupled through the logic circuitry to activate a CFRED output at the 12¼% duty cycle signal at the REDPULSE input.

Coupled to the Q output from this flip flop 184 is an OR gate 187 having a second input coupled to an input labeled CF49W at the left hand side of the figure. This means that the output from the OR gate 187 goes high in response to either a flow switch warning condition corresponding to 90% filter usage based upon sensed water flow or alternately a signal generated from the FIG. 12 circuit indicating it has been 49 weeks since the carbon filter was last changed. Following the logic of this output from the OR gate 187 to an AND gate 188, a second input to this subsequent AND gate 188 is derived from the end of life output 181a from the AND gate 180f (FIG. 11A). Since the end of life signal goes high upon reaching an end of life indication for the filter, if this condition has not yet been reached the second input to this AND gate 188 is high (since the end of life output 181a passes through an inverter 189) and therefore the output from the AND gate 188 is high.

A next subsequent AND gate 190 has an input 191 coupled to a carbon filter one year (CFIYR) input at the left hand side of the circuit. So long as this input is low (indicating one year has not elapsed from installation of the carbon filter), the input 191 to the AND gate 190 is high and a high output from the gate 190 is produced. This signal next reaches an AND gate 182b coupled to the FSWITCHD input so that the warning signal is output only if the flow switch senses water flow through the faucet. This AND gate 182b in turn generates an output to an AND gate 192a coupled to the REDPULSE input having a 2 second period with 12¼% duty cycle. This output is then transmitted to an OR gate 193 coupled to an AND gate 194b driven by the PULSE signal for generating a CFRED output. The red LED is thus activated as a warning and flashes at the 2 second duty cycle in response to the warning output 181b so long as water flow is sensed.

The end of life output 181a from the AND gate 180f (FIG. 11A) indicates the filter's useful life has been exceeded and in this instance, the red light is turned on continuously so long as the FSWITCHD signal derived from the input from the fluid flow switch indicates water is passing through the faucet. The EOL output 181a is coupled to an OR gate 195 having an output coupled to the AND gate 182c having a second input coupled to the FSWITCHD signal. The output from this AND gate 182c is coupled to the OR gate 193 and bypasses the AND gates 192a-192c coupled to the REDPULSE signal, resulting in the output from the AND gate 194b being continuous rather than pulsed. In a similar fashion, the various other inputs both from the counter and from the timer inputs at the left of the schematic generate appropriate signals for the LEDs.

Audible Output

An output from the AND gate 194e (FIG. 11B) generates an audio output signal for use in one embodiment of the invention. A one half second beep is generated at this output in response to either the carbon filter in the warning state (based on flow or time) or a low battery condition. Two one half second beeps are generated if either the carbon filter is beyond its useful life (flow or time sensed) or the UV sensor indicates no ultraviolet light input.

The appropriate audible outputs are controlled by the series of flip flops 200a–200e at the bottom of FIG. 11B. The series of five flip flops at the bottom of FIG. 11B determine whether the circuit responds to a sensed condition by generating 1 or 2 beeps.

Attention is now directed to the logic circuitry above the right hand of pair of flip flops 200d, 200e. One OR gate 201 has an input UV49W which goes high when a timer circuit (FIG. 12A) indicates the time since the UV filter was installed exceeds a warning condition threshold. The second of the two inputs to this OR gate 201 corresponds to a carbon filter 49 week signal at the output from the AND gate 190 so that the first OR gate 201 generates a high output in response to sensing either a 49 week UV or 49 week carbon filter warning indication. (NOTE: The 49 week input designation UV49W for the UV filter is somewhat of a misnomer since as described below the user can select time durations other than 1 year for the useful UV lifetime period.)

The output from the OR gate 201 is combined with a low battery signal (LOWBATT) from the flip flop 150a (FIG. 8) at a second OR gate 203 so that the output from this second OR gate 203 is high in response to the presence of a LOWBATT, a timed UV49W signal, or a flow sensor based WARNING signal.

The conditions indicating two rather than one beep should be generated override the single beep signal and the AND gate 204 coupled to the D input of the flip flop 200d determines this priority. Directly above the two flip flops 200d, 200e is an OR gate 205 having two inputs. One input is generated if the carbon filter has been in service for over one year or an end of life sensed flow condition has occurred. A second input to this OR gate 205 goes high in response to a 1 year UV filter installation time period or alternately the absence of a UV input UVIN sensed by the UV light sensor circuit 73. If these conditions are sensed by the OR gate 205 an output from this OR gate 205 goes high. This high signal is inverted by an inverter 206 and causes the output from the AND gate 204 coupled to the D input to the flip flop 200d to go low. The D input of the second flip flop 200e goes high and the left hand flip flop 200d generates a high Q output in response to a one beep condition and the second flip flop 200e generates a high output in response to a two beep condition when the FSWITCHD input goes high.

The Q outputs from these two flip flops 200d, 200e are coupled to logic circuitry having inputs derived from the three flip flops 200a–200c on the left of FIG. 11B. At the left of these flip flops 200a–200c a two hertz input 2HZ to the first flip flop 200a clocks that flip flop whenever the flow switch input FSWITCHD indicates water is flowing through the faucet. As seen above the series of three flip flops, the set input to these circuits is high in response to no water flow. When the flow switch input FSWITCHD goes high this high signal is inverted by an inverter 210 and provides a low signal to the set inputs S to the flip flops 200a–200c. This enables the flip flops and causes them to respond to clock inputs.

Once the flip flops 200a–200c are enabled, the Q outputs of each of the three flip flops goes high. Returning briefly to the right hand side of the schematic an AND gate 212 coupled to the audio output AUDIO has an input coupled to the flow switch input FSWITCHD and a second input coupled to the $\overline{Q}$ output of the flip flops 200a at the bottom left. Receipt of the first pulse of the two hertz signal frequency at the clock input to the flip flop 200a causes the $\overline{Q}$ output to go high if and only if the J and K inputs to the flip flop 200a are high. If this condition is satisfied receipt of the 2 hertz signal produces a half second beep from the audio output. Receipt of the next two hertz signal causes $\overline{Q}$ to again go low and deactivate the audio output. This corresponds to a single beep from he unit. The status of the J-K inputs to the flip flop 200a are controlled by an OR gate 214 having inputs coupled to two AND gates 216, 218. The OR gate output 214a cannot be high unless a Q output from one of the flip flops 200d, 200e is high so that the first beep is generated if and only if one of the two flip flops 200d, 200e has a high Q output.

Whether or not the second beep occurs also depends upon the state of the right hand two flip flops 200d, 200e. To inhibit the second beep, the J and K inputs to the three flip flops 200a, 200b, 200c go low after the first beep so that receipt of the 2 hertz signal does not further clock the first flip flop 200a. Receipt of a first of the 2 hertz input signals after receipt of the FSWITCHD signal causes the Q output from the first flip flop 200a to go high and the Q output from the second flip flop 200b to go low. This generates two low inputs to an OR gate 220 directly above the three flip flops and thereby produces a low output from the AND gate 216. If the J and K inputs to the flip flops 200a–200c are to remain high, a second AND gate 218 must then have both its inputs high indicating a 2 beep condition is satisfied. If the 2 beep condition is not satisfied, the J and K inputs go low and the flip flops 200a–200c do not respond to further clock signals appearing at the 2 hertz input. If the 2 beep priority AND gate 218 does include a high input from the flip flop 200e, the three flip flops continue to respond to the 2 hertz clock signal and in particular, receipt of the next subsequent clock signal causes the $\overline{Q}$ output from the first flip flop 200a to go high for another half second interval and generate another output from the audio output by enabling the AND gate 212. This is turned off by receipt of the next subsequent clock input at the 2 hertz input which also causes the Q output from the third flip flop to go low. It can be seen from evaluating the various Q and $\overline{Q}$ outputs from the flip flops 200a, 200b, 200c that outputs from both AND gates 216, 218 coupled to the OR gate 214 connected to the J and K inputs are now low. This deactivates the counter until receipt of a next subsequent set input when the input FSWITCHD goes high. It is therefore seen that either one beep or two beep of one half second duration are generated through the combination of the five flip flops at the bottom of FIG. 11B.

UV Light and Carbon Filter Timers

Figure 12A:
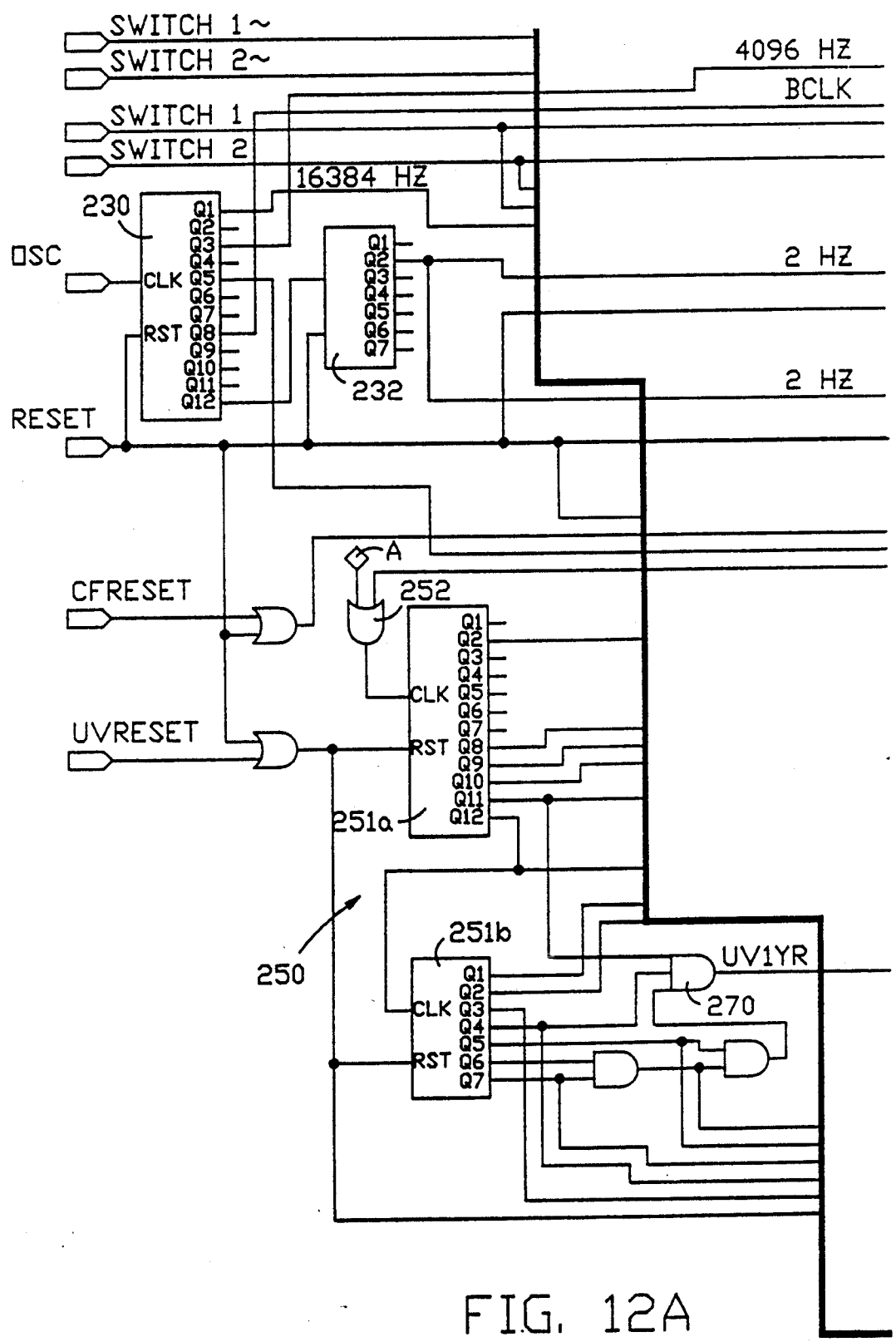
FIGS. 12A and 12B is a schematic of a circuit for generating timing pulses and accumulating total time since installation of the filter and a UV light used in one embodiment of the invention.
Figure 12B:
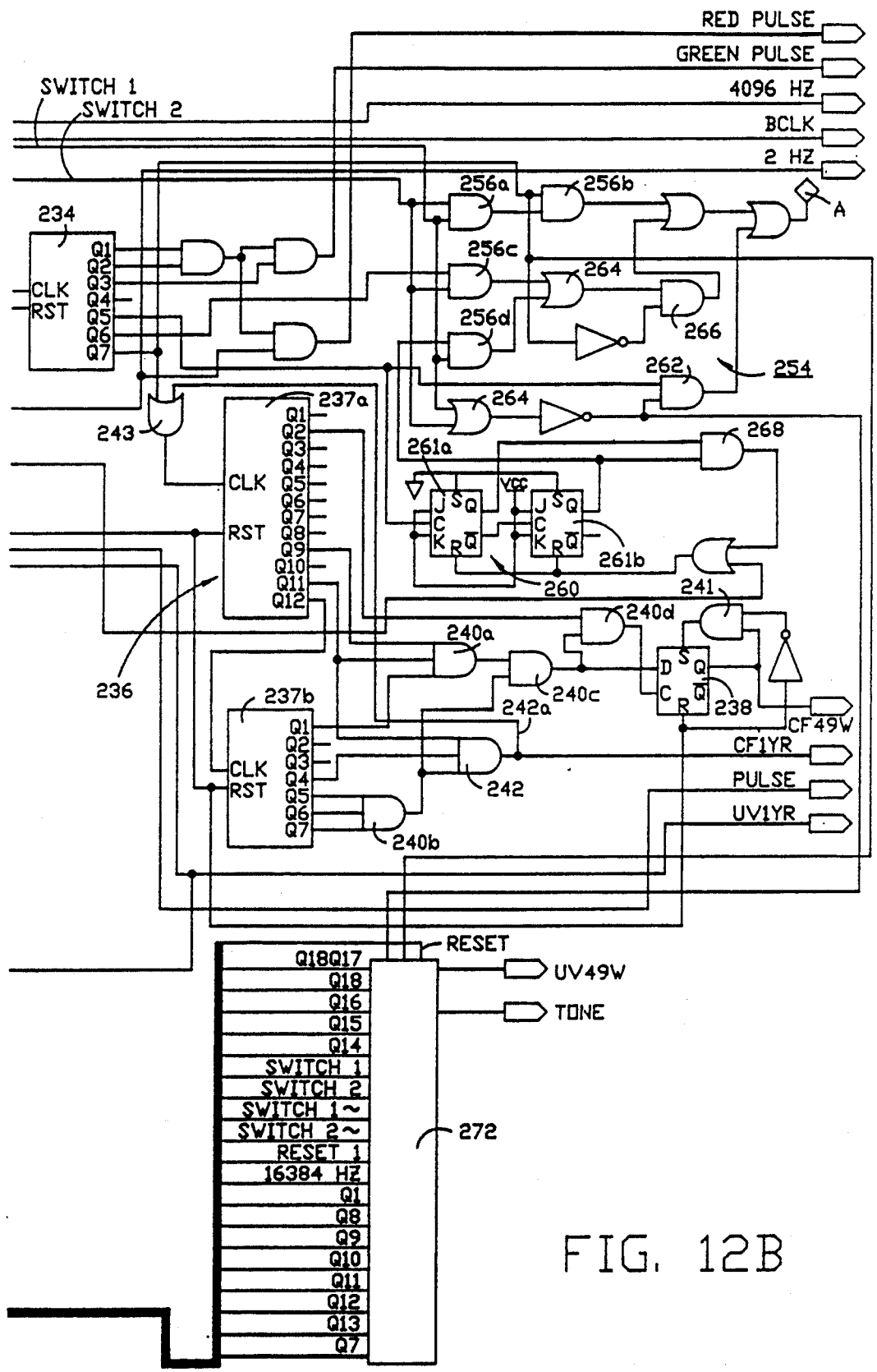

The circuitry depicted in FIGS. 12A, 12B generates timing signals used by the circuit 62. An OSC input is a signal having a frequency of 32 kilohertz from the oscillator 64. Three counter circuits 230, 232, 234 divide this 32 kilohertz signal. The Q3 output from the first counter 230 generates a 4 kilohertz output signal.

A carbon filter timer 236 constructed from two counter circuits 237a, 237b is clocked by the output from a pin designated Q7 of the counter circuit 234 at the upper left of FIG. 12B at a frequency of 0.25 hertz. The carbon filter timer 236 generates two output signals CF49W, CFIYR for use by the FIG. 11B circuitry. The carbon filter 49 week output signal CF49W comes from a latching flip flop 238 which responds to a series of AND gates 240a-240b coupled to the output from a carbon filter timer 236. When the counter 236 outputs cause the AND gate 240c to go high the counter has been counting for a 49 week period since the last carbon filter reset CFRESET that is user generated each time the carbon filter is changed. The flip flop 238 receives a high input at its D input and the AND gate 240d clocks this input to the Q output to create the 49 week signal. This is latched into the flip flop by a AND gate 241 coupled to the S input of the flip flop 238. Thus as time progresses and the carbon filter counter 236 counts beyond the 49 week period, the flip flop 238 maintains the 49 week output CF49W high for use by the FIG. 11B circuitry.

Once the carbon filter counter circuit 236 reaches a count corresponding to 1 year since receipt of the reset input CFRESET the output CFIYR goes high. A signal from an output 242a of an AND gate 242 is coupled to an OR gate 243 which clocks the counter so that the OR gate output remains high and the counter indication remains at the 1 year level. In this way, the 49 week and 1 year inputs are generated for use by the FIG. 11B logic circuit.

A UV timer circuit 250 constructed from two circuits 251a, 251b depicted in FIG. 12A operates in a similar fashion to generate outputs designated UV1YR and UV49W. The use of selectable input switches 73a, 73b (FIG. 6B) allow the designated end of UV life to be chosen as 1 year, 9 months, 6 months, or 3 months. Thus the UV 1YR output could change state after 1 year or 9 months, etc.

To achieve the variable end of UV filter timing, the input labelled A to an OR gate 252 which clocks the timer circuit 250 has a variable frequency. The particular output pin configuration that causes the output UV1YR to go high after one year also is the same output pin configuration for 3 months. By changing the frequency at which the counter is clocked the counter total is the same but the speed with which the counter reaches that total changes with the clock frequency.

The change in frequency is accomplished by a logic circuit 254 depicted in FIG. 12B. This logic circuit 254 includes a series of AND gates 256a-256d having inputs coupled to the switch inputs SWITCH1, SWITCH2. The SWITCH1 and SWITCH2 inputs can be adjusted to produce four different timing signal frequencies at the input A of the OR gate 252. High inputs at the two switch inputs SWITCH1, SWITCH2 correspond to a 12 month selection. As seen in FIG. 12B a high signal at both of the switch inputs SWITCH1, SWITCH2 activates a top AND gate 256a which in turn activates a next subsequent AND gate 256b passing signals from the Q7 output from the counter circuit 234 to the A output which in turn drives the UV timer circuit. In this way, the same frequency that drives the carbon filter timer 236 also drives the UV timer 250.

As the switch inputs SWITCH1, SWITCH2 are changed different ones of the AND gates that from the logic circuit 254 are activated.

The Q5 output from the COUNTER 234 is coupled to an AND gate 262 having a second input that goes high if both inputs to an OR gate 264 are low. Therefore, two low inputs to the switch inputs SWITCH1, SWITCH2 on the left portion of FIG. 7 cause the A clock signal to have a frequency 4 times the 1 year signal thereby producing an indication from the UV1YR output after only 3 months.

To achieve the 6 and 9 months periods, the three month frequency must either be cut in half or by one third. To cut it in half it is seen that the Q6 output from the counter 234 is coupled to an AND gate 256c having a second input coupled to the SWITCH2 input. An output from this AND gate 256c passes to an OR gate 264 which goes high at a frequency determined by the Q6 output from the counter. This signal will be passed through a further AND gate 266 only if the 12 months frequency is not chosen so that a high input at SWITCH1 and a low input at SWITCH2 causes the 6 month period frequency to appear as the output of clock A.

The remaining frequency to be discussed is the frequency to generate a 9 month UV1YR signal. This frequency is one third the frequency of the 3 month frequency. An AND gate 256d corresponding to the 9 month interval has one input coupled to SWITCH1 and a second input coupled to the Q output of a second flip flop 261b of the counter 260. Since the counter 260 is clocked at the frequency of the 3 month interval, (pin Q5 of the counter 234) after the counter 260 is reset the Q output from the second flip flop goes high in response to every third clock signal to the flip flop 261a. When the Q output from the flip flop 261b goes high it also sends a high signal to an AND gate 268 which causes the counter 260 to be reset. Therefore when only the SWITCH1 input is high (and the 12 month period is not chosen) does the 9 month frequency appears at the A input. As noted already, the A input clocks the UV timer 250. An end of life output UV1YR is generated by this timer at an output from an AND gate 270 in similar fashion to the carbon filter timer.

The warning signal UV49W is not as simple as for the carbon filter warning. In the preferred embodiment it is necessary to have the UV light warning occur a constant time period (three weeks) prior to the end of life signal UV1YR. It is therefore not possible to use the output of the UV counters directly since the outputs would be scaled in accordance with a frequency at which the timer is clocked. A circuit 272 corrects for this problem by having as inputs, the SWITCH1 and SWITCH2 signals as well as a number of the outputs from the UV timer circuit 250. Depending upon which clock frequency is chosen an appropriate UV 49 week output is generated at an appropriate time. In the preferred embodiment of this invention, this time is chosen to be approximately 3 weeks prior to the receipt of the end of life signal.

The circuit 272 produces a UV49W output 273 whenever the UV filter reaches a point of usage approximately 3 weeks prior to its end of life condition. The time period it takes the UV filter to reach this end of life condition varies depending upon the setting of the two switches SWITCH1, SWITCH2 so that the circuit 272 must take into account these switch settings in generating the output 273. A series of four flip flops 274–277 have their outputs coupled to AND gates 280-283 for generating the output 273. Inputs to the flip flops 273-277 are derived from a logic circuit 284 having as inputs coupled to outputs from the counter 250. Since the counter 250 is clocked at different rates depending upon the life of the ultraviolet filter, no single count can be used in determining when the filter has reached a count corresponding to three weeks prior to the end of the UV filter life. For this reason, the SWITCH1, SWITCH2 inputs are coupled to the AND gates 280-283 and an appropriate one of these four AND gates is active depending upon the switch settings. In a similar fashion, an appropriate count corresponding to three weeks prior to the end of life is presented at the D input to the flip flops 274-277 and this data is clocked into the flip flops upon receipt of a next Q1 input from the counter 250. The Q state of the flip flop is latched by a feed back latch circuit having an AND gate tied to the S input of each of the flip flops. In summary, depending upon the frequency with which the counter 250 is clocked, one of four different counts for the counter 250 corresponds to a point in time three weeks prior to the end of life signal. That count causes an associated flip flop to transmit an output to appropriate AND gate 280-283 and then to the output 273.

Indicator Housing

The custom integrated circuit 62 is mounted to a printed circuit board supported by a cover 300 (FIG. 13) that covers a carbon filter that routes water to a faucet. Since in a preferred embodiment, the invention is used in conjunction with a household faucet, the cover 300 mates with a carbon filter module or canister 302 supported by a kitchen sink cabinet. In an embodiment having audible warning indication the carbon filter module mounts beneath the sink cabinet and in an embodiment not including an audible warning, the module is mounted in a position where the light emitting diodes 80, 82, 84, 86 carried by the cover 300 are visible to the user.

The cover 300 is generally circular in plan and defines two opposed mounting tabs 304, 305, 306 that extend away from the cover 300 and engage the carbon filter canister 302 to which the cover 300 is attached. As seen most clearly in the section view of FIG. 15, the cover 300 supports a printed circuit board support 308 which removably engages the cover 300 so that the printed circuit board support 308 can be separated from the cover 300 to allow servicing of the circuit 62 as well as battery replacement.

In an installed orientation, the printed circuit board support 308 lies in a plane generally parallel to a front surface 300a of the cover 300. In this orientation, a printed circuit board 310 supporting the circuitry for evaluating filter life condition is also generally parallel to the front surface 300a.

As seen in FIG. 14, the printed circuit board support 308 defines a cavity 312 for supporting a battery (not shown) that engages an electrical connector 314 for routing energization signals to the printed circuit board 310. The conductors 54a, 54b from the flow sensing switch 50 are coupled to the printed circuit board 310 and a signal across these conductors forms the FSWITCH input. A dip switch 312 allows selection of the values for flow rate and filter life. Reset switches 313, 314 are momentarily pressed when the UV light or carbon filter are changed.

The custom integrated circuit 62 is seen to be centrally located on the printed circuit board 310 for monitoring inputs and selectively activating one or more of the light emitting diodes supported along an exposed indicator face 320 of the cover 300. In the embodiment of the invention depicted in FIG. 13, the printed circuit board support carries three light emitting diodes 80, 82, 86 and an audible buzzer 90. The light emitting diodes are green, red, and amber, the latter to indicate a low battery condition. The support 308 defines a cavity 316 to support the buzzer 90.

Since the invention contemplates various alternate designs such as designs which include both carbon filter and UV treatment of the water, and in addition contemplates use of a design having no audible indication, various other printed circuit board and light emitting diode support configurations are contemplated. The circuit 62 is preferably implemented in the form of an application specific integrated circuit (ASIC) and it is therefore appreciated that while the functionality of a commercial embodiment of the invention has been disclosed the circuitry of the ASIC may differ somewhat from the circuitry described.

The present invention has been described with a degree of particularity. It is the intent, however, that the invention include all modifications and alterations from the disclosed design falling within the spirit or scope of the appended claims.

We claim:

1. Apparatus for providing an indication of the condition of a fluid treatment filter comprising:
   a) structure including a filter defining a flow path along which fluid to be treated flows;
   b) a flow sensor for sensing fluid flow passing along said flow path and providing a flow signal based on fluid flow in the flow path, said flow sensor comprising:
      i) a fluid flow responsive, moveable member disposed within the flow path adapted to move in response to fluid flow in the flow path exceeding a threshold flow rate; and
      ii) a switch adapted to change state in response to fluid flow induced movement of the moveable member to provide a flow signal;
   c) circuitry electrically coupled to the flow sensor including a first timer for timing intervals of fluid flow in the flow path in response to the flow signal and arranged for providing a first timer signal when a timed fluid flow exceeds a predetermined flow time period; and
   d) an indicator having a control input electrically coupled to the first timer to provide an indication of the filter condition in response to the first timer signal that is based upon the time period of fluid flow through the filter.

2. The apparatus of claim 1 wherein the indicator comprises an indicating light.

3. The apparatus of claim 1 further comprising a conduit forming part of said flow path defining structure, said conduit being in fluid communication with a faucet and wherein the movable member is positioned for movement within a stepped diameter region of the conduit and wherein said movable member moves in response to pressure differentials across the stepped diameter region.

4. The apparatus of claim 3 wherein the moveable member comprises a magnet supported within the conduit and wherein said switch is positioned outside the conduit and includes switch contacts that open or close in response to movement of the magnet.

5. The apparatus of claim 3 wherein the circuitry additionally comprises a light sensor for monitoring an ultraviolet light used to treat water passing through the conduit and for providing a light deficiency indication signal to said indicator in the absence of the ultraviolet light.

6. The apparatus of claim 1 wherein the circuitry additionally comprises a second timer for monitoring a second time period, unrelated to fluid flow in the flow path from a time the apparatus began monitoring the condition of the filter and for providing a second time signal to the indicator after said second time period has elapsed.

7. A method for monitoring fluid flow through a fluid treatment filter placed in a fluid flow path leading to a faucet by use of circuitry and comprising the steps of:
   a) positioning a fluid flow responsive, movable sensor in the fluid flow path adapted to move in response to fluid flow in the fluid flow path;
   b) monitoring a position of the moveable sensor as a user opens and closes the faucet and providing a two-state signal output based on the position of a moveable member in the fluid flow path, one state of the two state signal output indicating that the fluid flow in the fluid flow path exceeds a threshold rate;
   c) initializing a timer when the filter is installed in the flow path;
   d) energizing said timer whenever said one state of the two state signal output is present; said timer providing a timer output related to an aggregate time of fluid flow through the filter of at least the threshold rate since installation of said filter;
   e) comparing the timer output with a predetermined value corresponding to a predetermined amount of filter use; and
   f) when the timer output reaches the predetermined value, activating an indicator to indicate that a predetermined amount of filter use has occurred.

8. The method of claim 7 wherein the indicator is a visible warning light and the activating step is accomplished by activating the warning light when fluid flow is sensed in the fluid flow path subsequent to said predetermined amount of filter use.

9. The method of claim 8 wherein the timer comprises a counter and wherein multiple predetermined amounts of filter use are correlated with different count totals and further wherein a running count total is compared to said different count totals and the warning light is activated in a different manner dependent on which different count total is exceeded by the running count total.

10. The method of claim 7 additionally comprising the steps of:
   i) treating the fluid with an ultraviolet light;
   ii) monitoring the ultraviolet light using a light sensor, and,
   iii) activating a light deficiency indication signal if the light is not sensed.

11. Apparatus for providing an indication of a condition of a filter used in treating water dispensed from a faucet comprising:
   a) means comprising an on/off switch or providing a flow signal when water is flowing through a conduit leading to an outlet;
   b) a flow timer electrically coupled to the on/off switch and responsive to said flow signal, said timer being operative to measure an interval of time that the on/off switch is providing said flow signal including means for accumulating said intervals; said timer being further operative to provide a timer output when a total of the accumulated intervals reaches a predetermined time period;
   c) said timer comprising a clock for providing regularly occurring clock pulses, a counter for counting the regularly occurring clock pulses, and selector means for adjustably determining a proportion of clock pulses which are counted by the counter; and
   d) an indicator having a control input coupled to the flow timer to provide an indication in response to a timer output based upon the time period of water flow through the filter.

12. The apparatus of claim 11 wherein the indicator comprises an indicating light.

13. The apparatus of claim 11 wherein the timer further comprises a comparator for comparing the count of the counter with a threshold count indicating the predetermined time interval has elapsed.

14. The apparatus of claim 13 wherein the selector means is adapted to count only a specified, adjustable portion of the pulses to provide a means of adjusting the predetermined time interval while the threshold count is fixed.

15. A method for monitoring a condition of a filter for treating water dispensed by a faucet by use of circuitry and comprising the steps of:
   a) monitoring water flow in a water flow path leading to a faucet by positioning a fluid flow responsive, movable member in the water flow path and providing an output when the water flow reaches a threshold flow sufficient to move the movable member to a flow indicating position;
   b) initializing a timer circuit each time a filter is installed;
   c) activating said timer circuit in response to the output indicating water is flowing to the faucet; said timer circuit providing a timer output related to aggregate time of water flow equaling or exceeding the threshold flow since initialization of the timer circuit;
   d) using the timer circuit for comparing the aggregate time with a predetermined time duration corresponding to a useful filter life; and
   e) when the aggregate time indicated by the time circuit output reaches the predetermined time duration, activating an indicator to provide an indication that the filter should be replaced.

16. The method of claim 15 wherein the indicator is a visible warning light and the activating step is accomplished by activating the warning light.

17. The method of claim 15 wherein the timer circuit includes a source of repetitive pulses, the time circuit counts an adjustable proportion of pulses per unit time, and the comparing step is performed by comparing a timer circuit count with a threshold count to determine if the predetermined time period has been reached.

18. Apparatus for providing an indication of the condition of a filter that treats a fluid comprising:
   a) a conduit that defines a portion of a fluid flow path leading to or from a filter;
   b) a fluid flow responsive, moveable member positioned within the conduit adapted to move to a flow indicating position when fluid flow through the conduit equals or exceeds a threshold flow rate;

c) a flow sensor having a switch that changes state in response to movement of the moveable member to the flow indicating position to produce a flow indicating output signal;

d) circuitry electrically coupled to the switch and including a timer responsive to the flow indicating output signal for timing periods of fluid flow through the conduit; said timer including means for accumulating the timing periods and output means for providing an indicator output signal when the accumulated fluid flow time periods exceed a predetermined time period; and e) an indicator having a control input electrically coupled to the indicator output signal to provide an indication of filter condition.

* * * * *

REEXAMINATION CERTIFICATE (3053rd)

United States Patent [19]

Ozkahyaoglu et al.

[11] B1 5,089,144

[45] Certificate Issued Nov. 12, 1996

[54] FILTER CONDITION INDICATOR HAVING MOVEABLE SENSOR AND AGGREGATE FLOW COUNTER

[75] Inventors: Aysegul Ozkahyaoglu; Marty M. Zoerner, both of Reed City, Mich.

[73] Assignee: Nartron Corporation, Reed City, Mich.

Reexamination Request:
No. 90/002,737, May 28, 1992

Reexamination Certificate for:
Patent No.: 5,089,144
Issued: Feb. 18, 1992
Appl. No.: 447,794
Filed: Dec. 8, 1989

[51] Int. Cl.$^6$ ................................................ B01D 35/143
[52] U.S. Cl. .................... 210/767; 73/861.52; 210/87; 210/192; 210/806; 340/606; 340/825.65
[58] Field of Search ........................... 210/85, 87, 138, 210/192, 739, 744, 748, 767, 94, 259; 73/861.52, 861.63, 861.79; 55/270, 274; 364/569; 340/606, 607, 609, 611, 825.57, 825.65; 200/81.9 R, 81.9 M; 116/273, 274, 275, DIG. 25, DIG. 46

[56] References Cited

U.S. PATENT DOCUMENTS

| | | | |
|---|---|---|---|
| 2,892,051 | 6/1959 | Moore | 200/81.9 |
| 3,749,864 | 7/1973 | Tice | 200/81.9 |
| 3,857,277 | 12/1974 | Moore | 73/227 |
| 4,081,635 | 3/1978 | Moore | 200/81.9 |
| 4,166,936 | 9/1979 | Tice | 200/82 E |
| 4,885,081 | 12/1989 | Oliver | 210/87 |
| 4,996,396 | 2/1991 | Smith | 200/81.9 M |

OTHER PUBLICATIONS

Sensors Level•Flow•Relays—IMO Copyright 1989.
Liquid Level Switches—IMO Copyright 1987.
Siphon Tube Liquid Level Switch IMO No Date.
Flow Switches Flow Controls IMO Copyright 1987.
Failsafe Flow Switching with Positive Visual Indication IMO Copyright 1989.
Translation Japanese Utility Model Public Disclosure 58–62230., undated.
Fluid Control Devices A0016411–A0016442 Copyright 1986.
Pureflow Air Treatment System II, "Your Solution to Indoor Air Pollution," Copyright 1992, A013763–A013770.
Pure Flow™ Air Treatment System, "Owners Manual" A013733–A013762, undated.

*Primary Examiner*—Joseph Drodge

[57] ABSTRACT

A fluid filter monitoring system. A flow switch positioned in juxtaposition to a fluid flow path monitors fluid flow and provides an indication during those time periods when fluid is flowing at a rate exceeding a predetermined flow rate through the flow path. A monitoring circuit coupled to this indication provides various audible and/or visible indicators corresponding to detected conditions. The preferred design includes a timer for monitoring the time duration since the filter was installed as well as monitoring the time duration water or other fluids are flowing through the filter. Adjustably settable visible and/or audible indications are provided to indicate when the filter is reaching the end of its useful life as well as when this life period has been exceeded.

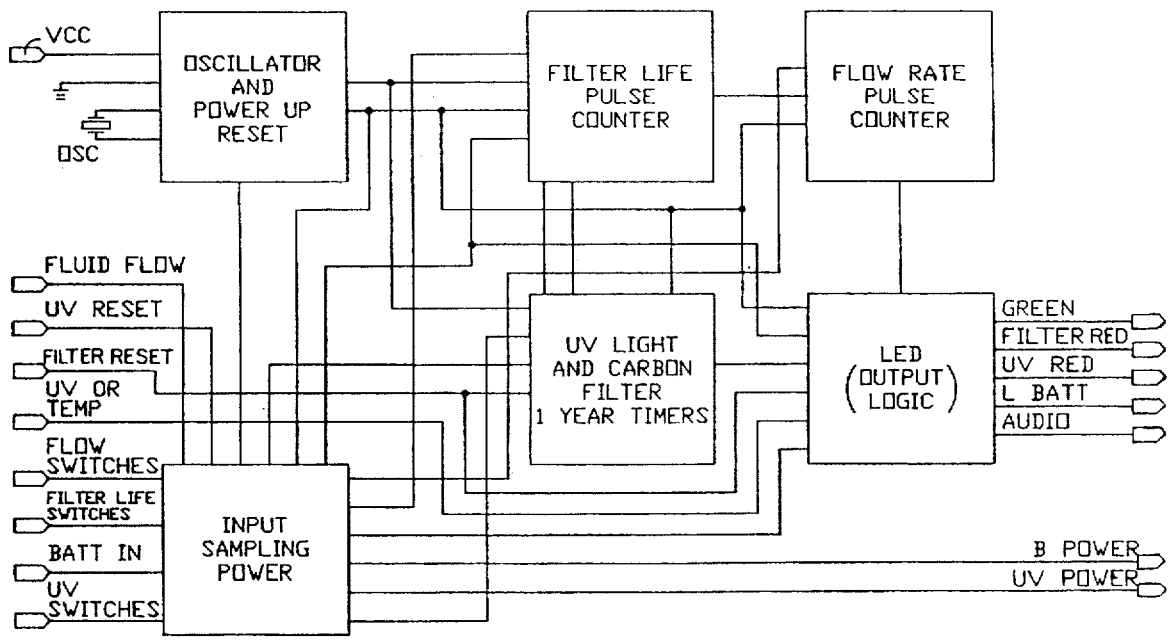

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–14, 17 and 18 is confirmed.

Claims 15 and 16 are cancelled.

* * * * *